US011086979B1

(12) United States Patent
Giobbi

(10) Patent No.: US 11,086,979 B1
(45) Date of Patent: *Aug. 10, 2021

(54) SECURITY SYSTEM AND METHOD FOR CONTROLLING ACCESS TO COMPUTING RESOURCES

(71) Applicant: Proxense, LLC, Bend, OR (US)

(72) Inventor: John J. Giobbi, Bend, OR (US)

(73) Assignee: Proxense, LLC, Bend, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/672,214

(22) Filed: Nov. 1, 2019

Related U.S. Application Data

(63) Continuation of application No. 14/973,565, filed on Dec. 17, 2015, now Pat. No. 10,469,456, which is a
(Continued)

(51) Int. Cl.
  *G06F 21/35* (2013.01)
  *G06F 21/34* (2013.01)
  *H04L 29/06* (2006.01)

(52) U.S. Cl.
  CPC .............. *G06F 21/35* (2013.01); *G06F 21/34* (2013.01); *H04L 63/0428* (2013.01); *H04L 63/06* (2013.01); *G06F 2221/2115* (2013.01)

(58) Field of Classification Search
  CPC .. G06F 21/35; G06F 21/34; G06F 2221/2115; H04L 63/0428; H04L 63/06
  See application file for complete search history.

(56) References Cited

U.S. PATENT DOCUMENTS 3,665,313 A 5/1972 Trent
3,739,329 A 6/1973 Lester
(Continued)

FOREIGN PATENT DOCUMENTS

JP H 10-49604 2/1998
WO 00/62505 10/2000
(Continued)

OTHER PUBLICATIONS

Micronas, "Micronas and Thomson Multimedia Showcase a New Copy Protection System that Will Drive the Future of Digital Television," Jan. 8, 2002, retrieved from www.micronas.com/press/pressreleases/printer.php?ID=192 on Mar. 4, 2002, 3 pgs.
(Continued)

*Primary Examiner* — Catherine Thiaw
(74) *Attorney, Agent, or Firm* — Patent Law Works LLP

(57) ABSTRACT

A security system comprises a personal digital key (PDK), a reader and a computing device. The PDK is a portable, personal transceiver that includes a controller and one or more passwords or codes. The computing device includes a detection engine, vault storage and a set up module. The detection engine detect events relating to the access of any files and third-party systems by the computing device and receives information from the reader as to whether the PDK is present/linked. The detection engine controls whether a user is able to access any of the functionality provided by the computing device based upon whether the PDK is in communication with the reader or not. The present invention also includes a number of methods such as a method for initializing the security system, a method for setting up a computing device, and a method for controlling access to computing resources.

20 Claims, 14 Drawing Sheets

Related U.S. Application Data continuation of application No. 12/340,501, filed on Dec. 19, 2008, now Pat. No. 9,251,332.

(60) Provisional application No. 61/015,110, filed on Dec. 19, 2007.

(56) References Cited

U.S. PATENT DOCUMENTS

| | | |
|---|---|---|
| 3,761,883 A | 9/1973 | Alvarez et al. |
| 3,906,166 A | 9/1975 | Cooper et al. |
| 4,101,873 A | 7/1978 | Anderson et al. |
| 4,430,705 A | 2/1984 | Cannavino et al. |
| 4,476,469 A | 10/1984 | Lander |
| 4,598,272 A | 7/1986 | Cox |
| 4,661,821 A | 4/1987 | Smith |
| 4,759,060 A | 7/1988 | Hayashi et al. |
| 4,814,742 A | 3/1989 | Morita et al. |
| 4,871,997 A | 10/1989 | Adriaenssens et al. |
| 4,993,068 A | 2/1991 | Piosenka et al. |
| 5,043,702 A | 8/1991 | Chun-Chang |
| 5,187,352 A | 2/1993 | Blair et al. |
| 5,224,164 A | 6/1993 | Elsner |
| 5,296,641 A | 3/1994 | Stelzel |
| 5,307,349 A | 4/1994 | Shloss et al. |
| 5,317,572 A | 5/1994 | Satoh |
| 5,325,285 A | 6/1994 | Araki |
| 5,392,287 A | 2/1995 | Tiedemann, Jr. et al. |
| 5,392,433 A | 2/1995 | Hammersley et al. |
| 5,410,588 A | 4/1995 | Ito |
| 5,416,780 A | 5/1995 | Patel |
| 5,422,632 A | 6/1995 | Bucholtz et al. |
| 5,428,684 A | 6/1995 | Akiyama et al. |
| 5,450,489 A | 9/1995 | Ostrover et al. |
| 5,473,690 A | 12/1995 | Grimonprez et al. |
| 5,481,265 A | 1/1996 | Russell |
| 5,506,863 A | 4/1996 | Meidan et al. |
| 5,517,502 A | 5/1996 | Bestler et al. |
| 5,541,583 A | 7/1996 | Mandelbaum |
| 5,544,321 A | 8/1996 | Theimer et al. |
| 5,552,776 A * | 9/1996 | Wade ............... G06F 21/31 340/5.22 |
| 5,563,947 A | 10/1996 | Kikinis |
| 5,589,838 A | 12/1996 | McEwan |
| 5,594,227 A | 1/1997 | Deo |
| 5,598,474 A | 1/1997 | Johnson |
| 5,611,050 A | 3/1997 | Theimer et al. |
| 5,619,251 A | 4/1997 | Kuroiwa et al. |
| 5,623,552 A | 4/1997 | Lane |
| 5,629,980 A | 5/1997 | Stefik et al. |
| 5,644,354 A | 7/1997 | Thompson et al. |
| 5,666,412 A | 9/1997 | Handelman et al. |
| 5,689,529 A | 11/1997 | Johnson |
| 5,692,049 A | 11/1997 | Johnson et al. |
| 5,719,387 A | 2/1998 | Fujioka |
| 5,729,237 A | 3/1998 | Webb |
| 5,760,705 A | 6/1998 | Glessner et al. |
| 5,760,744 A | 6/1998 | Sauer |
| 5,773,954 A | 6/1998 | VanHorn |
| 5,784,464 A | 7/1998 | Akiyama et al. |
| 5,799,085 A | 8/1998 | Shona |
| 5,821,854 A | 10/1998 | Dorinski et al. |
| 5,825,876 A | 10/1998 | Peterson, Jr. |
| 5,835,595 A | 11/1998 | Fraser et al. |
| 5,838,306 A | 11/1998 | O'Connor et al. |
| 5,854,891 A * | 12/1998 | Postlewaite ............ G06F 21/34 726/20 |
| 5,857,020 A | 1/1999 | Peterson, Jr. |
| 5,886,634 A | 3/1999 | Muhme |
| 5,892,825 A | 4/1999 | Mages et al. |
| 5,892,900 A | 4/1999 | Ginter et al. |
| 5,894,551 A | 4/1999 | Huggins et al. |
| 5,898,880 A | 4/1999 | Ryu |
| 5,910,776 A | 6/1999 | Black |
| 5,917,913 A | 6/1999 | Wang |
| 5,923,757 A | 7/1999 | Hocker et al. |
| 5,928,327 A | 7/1999 | Wang et al. |
| 5,991,399 A | 11/1999 | Graunke et al. |
| 5,991,749 A | 11/1999 | Morrill, Jr. |
| 6,016,476 A | 1/2000 | Maes et al. |
| 6,018,739 A | 1/2000 | McCoy et al. |
| 6,025,780 A | 2/2000 | Bowers et al. |
| 6,035,038 A | 3/2000 | Campinos et al. |
| 6,035,329 A | 3/2000 | Mages et al. |
| 6,038,334 A | 3/2000 | Hamid |
| 6,038,666 A | 3/2000 | Hsu et al. |
| 6,040,786 A | 3/2000 | Fujioka |
| 6,041,410 A | 3/2000 | Hsu et al. |
| 6,042,006 A | 3/2000 | Van Tilburg et al. |
| 6,055,314 A | 4/2000 | Spies et al. |
| 6,068,184 A | 5/2000 | Barnett |
| 6,070,796 A | 6/2000 | Sirbu |
| 6,076,164 A | 6/2000 | Tanaka et al. |
| 6,088,450 A | 7/2000 | Davis et al. |
| 6,088,730 A | 7/2000 | Kato et al. |
| 6,104,290 A | 8/2000 | Naguleswaran |
| 6,104,334 A | 8/2000 | Allport |
| 6,110,041 A | 8/2000 | Walker et al. |
| 6,121,544 A | 9/2000 | Petsinger |
| 6,134,283 A | 10/2000 | Sands et al. |
| 6,137,480 A | 10/2000 | Shintani |
| 6,138,010 A | 10/2000 | Rabe et al. |
| 6,148,142 A | 11/2000 | Anderson |
| 6,148,210 A | 11/2000 | Elwin et al. |
| 6,161,179 A | 12/2000 | Seidel |
| 6,177,887 B1 | 1/2001 | Jerome |
| 6,185,316 B1 | 2/2001 | Buffam |
| 6,189,105 B1 | 2/2001 | Lopes |
| 6,209,089 B1 | 3/2001 | Selitrennikoff et al. |
| 6,219,109 B1 | 4/2001 | Raynesford et al. |
| 6,219,439 B1 | 4/2001 | Burger |
| 6,219,553 B1 | 4/2001 | Panasik |
| 6,237,848 B1 | 5/2001 | Everett |
| 6,240,076 B1 | 5/2001 | Kanerva et al. |
| 6,247,130 B1 | 6/2001 | Fritsch |
| 6,249,869 B1 | 6/2001 | Drupsteen et al. |
| 6,256,737 B1 | 7/2001 | Bianco et al. |
| 6,266,415 B1 | 7/2001 | Campinos et al. |
| 6,270,011 B1 | 8/2001 | Gottfried |
| 6,279,111 B1 | 8/2001 | Jensenworth et al. |
| 6,279,146 B1 | 8/2001 | Evans et al. |
| 6,295,057 B1 | 9/2001 | Rosin et al. |
| 6,307,471 B1 | 10/2001 | Xydis |
| 6,325,285 B1 | 12/2001 | Baratelli |
| 6,336,121 B1 | 1/2002 | Lyson et al. |
| 6,336,142 B1 | 1/2002 | Kato et al. |
| 6,343,280 B2 | 1/2002 | Clark |
| 6,345,347 B1 | 2/2002 | Biran |
| 6,363,485 B1 | 3/2002 | Adams et al. |
| 6,367,019 B1 | 4/2002 | Ansell et al. |
| 6,369,693 B1 | 4/2002 | Gibson |
| 6,370,376 B1 | 4/2002 | Sheath |
| 6,381,029 B1 | 4/2002 | Tipirneni |
| 6,381,747 B1 | 4/2002 | Wonfor et al. |
| 6,385,596 B1 | 5/2002 | Wiser et al. |
| 6,392,664 B1 | 5/2002 | White et al. |
| 6,397,387 B1 | 5/2002 | Rosin et al. |
| 6,401,059 B1 | 6/2002 | Shen et al. |
| 6,411,307 B1 | 6/2002 | Rosin et al. |
| 6,424,249 B1 | 7/2002 | Houvener |
| 6,424,715 B1 | 7/2002 | Saito |
| 6,425,084 B1 | 7/2002 | Rallis et al. |
| 6,434,403 B1 | 8/2002 | Ausems et al. |
| 6,434,535 B1 | 8/2002 | Kupka et al. |
| 6,446,004 B1 | 9/2002 | Cao et al. |
| 6,446,130 B1 | 9/2002 | Grapes |
| 6,463,534 B1 | 10/2002 | Geiger et al. |
| 6,480,101 B1 | 11/2002 | Kelly et al. |
| 6,480,188 B1 | 11/2002 | Horsley |
| 6,484,182 B1 | 11/2002 | Dunphy et al. |
| 6,484,260 B1 | 11/2002 | Scott et al. |
| 6,484,946 B2 | 11/2002 | Matsumoto et al. |
| 6,487,663 B1 | 11/2002 | Jaisimha et al. |
| 6,490,443 B1 | 12/2002 | Freeny, Jr. |

(56) References Cited

U.S. PATENT DOCUMENTS

| | | |
|---|---|---|
| 6,510,350 B1 | 1/2003 | Steen, III et al. |
| 6,522,253 B1 | 2/2003 | Saltus |
| 6,523,113 B1 | 2/2003 | Wehrenberg |
| 6,529,949 B1 | 3/2003 | Getsin et al. |
| 6,546,418 B2 | 4/2003 | Schena et al. |
| 6,550,011 B1 | 4/2003 | Sims, III |
| 6,563,465 B2 | 5/2003 | Frecska |
| 6,563,805 B1 | 5/2003 | Murphy |
| 6,564,380 B1 | 5/2003 | Ma et al. |
| 6,577,238 B1 | 6/2003 | Whitesmith et al. |
| 6,593,887 B2 | 7/2003 | Luk et al. |
| 6,597,680 B1 | 7/2003 | Lindskog et al. |
| 6,607,136 B1 | 8/2003 | Atsmon et al. |
| 6,628,302 B2 | 9/2003 | White et al. |
| 6,632,992 B2 | 10/2003 | Hasegawa |
| 6,633,981 B1 | 10/2003 | Davis |
| 6,645,077 B2 | 11/2003 | Rowe |
| 6,647,417 B1 | 11/2003 | Hunter et al. |
| 6,657,538 B1 | 12/2003 | Ritter |
| 6,658,566 B1 | 12/2003 | Hazard |
| 6,667,684 B1 | 12/2003 | Waggamon et al. |
| 6,669,096 B1 | 12/2003 | Saphar et al. |
| 6,671,808 B1 | 12/2003 | Abbott et al. |
| 6,683,954 B1 | 1/2004 | Searle |
| 6,697,944 B1 | 2/2004 | Jones et al. |
| 6,709,333 B1 | 3/2004 | Bradford et al. |
| 6,711,464 B1 | 3/2004 | Yap et al. |
| 6,714,168 B2 | 3/2004 | Berenbaum |
| 6,715,246 B1 | 4/2004 | Frecska et al. |
| 6,728,397 B2 | 4/2004 | McNeal |
| 6,737,955 B2 | 5/2004 | Ghabra et al. |
| 6,758,394 B2 | 7/2004 | Maskatiya et al. |
| 6,771,969 B1 | 8/2004 | Chinoy et al. |
| 6,775,655 B1 | 8/2004 | Peinado et al. |
| 6,785,474 B2 | 8/2004 | Hirt et al. |
| 6,788,640 B2 | 9/2004 | Celeste |
| 6,788,924 B1 | 9/2004 | Knutson et al. |
| 6,795,425 B1 | 9/2004 | Raith |
| 6,804,825 B1 | 10/2004 | White et al. |
| 6,806,887 B2 | 10/2004 | Chernock et al. |
| 6,839,542 B2 | 1/2005 | Sibecas et al. |
| 6,850,147 B2 | 2/2005 | Prokoski et al. |
| 6,853,988 B1 | 2/2005 | Dickinson et al. |
| 6,859,812 B1 | 2/2005 | Poynor |
| 6,861,980 B1 | 3/2005 | Rowitch et al. |
| 6,873,975 B1 | 3/2005 | Hatakeyama et al. |
| 6,879,567 B2 | 4/2005 | Callaway et al. |
| 6,879,966 B1 | 4/2005 | Lapsley et al. |
| 6,886,741 B1 | 5/2005 | Salveson |
| 6,889,067 B2 | 5/2005 | Willey |
| 6,891,822 B1 | 5/2005 | Gubbi et al. |
| 6,892,307 B1 | 5/2005 | Wood et al. |
| 6,930,643 B2 | 8/2005 | Byrne et al. |
| 6,947,003 B2 | 9/2005 | Huor |
| 6,950,941 B1 | 9/2005 | Lee et al. |
| 6,957,086 B2 | 10/2005 | Bahl et al. |
| 6,961,858 B2 | 11/2005 | Fransdonk |
| 6,963,270 B1 | 11/2005 | Gallagher, III et al. |
| 6,963,971 B1 | 11/2005 | Bush et al. |
| 6,973,576 B2 | 12/2005 | Giobbi |
| 6,975,202 B1 | 12/2005 | Rodriguez et al. |
| 6,980,087 B2 | 12/2005 | Zukowski |
| 6,983,882 B2 | 1/2006 | Cassone |
| 6,999,023 B2 | 2/2006 | Pakray et al. |
| 6,999,032 B2 | 2/2006 | Pakray et al. |
| 7,012,503 B2 | 3/2006 | Nielsen |
| 7,020,635 B2 | 3/2006 | Hamilton et al. |
| 7,031,945 B1 | 4/2006 | Donner |
| 7,049,963 B2 | 5/2006 | Waterhouse et al. |
| 7,055,171 B1 | 5/2006 | Martin et al. |
| 7,058,806 B2 | 6/2006 | Smeets et al. |
| 7,061,380 B1 | 6/2006 | Orlando et al. |
| 7,068,623 B1 | 6/2006 | Barany et al. |
| 7,072,900 B2 | 7/2006 | Sweitzer et al. |
| 7,079,079 B2 | 7/2006 | Jo et al. |
| 7,080,049 B2 | 7/2006 | Truitt et al. |
| 7,082,415 B1 | 7/2006 | Robinson et al. |
| 7,090,126 B2 | 8/2006 | Kelly et al. |
| 7,090,128 B2 | 8/2006 | Farley et al. |
| 7,100,053 B1 | 8/2006 | Brown et al. |
| 7,107,455 B1 | 9/2006 | Merkin |
| 7,107,462 B2 | 9/2006 | Fransdonk |
| 7,111,789 B2 | 9/2006 | Rajasekaran et al. |
| 7,112,138 B2 | 9/2006 | Hedrick et al. |
| 7,119,659 B2 | 10/2006 | Bonalle et al. |
| 7,123,149 B2 | 10/2006 | Nowak et al. |
| 7,130,668 B2 | 10/2006 | Chang et al. |
| 7,131,139 B1 | 10/2006 | Meier |
| 7,137,008 B1 | 11/2006 | Hamid et al. |
| 7,137,012 B1 | 11/2006 | Kamibayashi et al. |
| 7,139,914 B2 | 11/2006 | Arnouse |
| 7,150,045 B2 | 12/2006 | Koelle et al. |
| 7,155,416 B2 | 12/2006 | Shatford |
| 7,159,114 B1 | 1/2007 | Zajkowski et al. |
| 7,159,765 B2 | 1/2007 | Frerking |
| 7,167,987 B2 | 1/2007 | Angelo |
| 7,168,089 B2 | 1/2007 | Nguyen et al. |
| 7,176,797 B2 | 2/2007 | Zai et al. |
| 7,191,466 B1 | 3/2007 | Hamid et al. |
| 7,209,955 B1 | 4/2007 | Major et al. |
| 7,218,944 B2 | 5/2007 | Cromer et al. |
| 7,225,161 B2 | 5/2007 | Lam et al. |
| 7,230,908 B2 | 6/2007 | Vanderaar et al. |
| 7,231,068 B2 | 6/2007 | Tibor |
| 7,231,451 B2 | 6/2007 | Law et al. |
| 7,242,923 B2 | 7/2007 | Perera et al. |
| 7,249,177 B1 | 7/2007 | Miller |
| 7,272,723 B1 | 9/2007 | Abbott et al. |
| 7,277,737 B1 | 10/2007 | Vollmer et al. |
| 7,278,025 B2 | 10/2007 | Saito et al. |
| 7,283,650 B1 | 10/2007 | Sharma et al. |
| 7,295,119 B2 | 11/2007 | Rappaport et al. |
| 7,305,560 B2 | 12/2007 | Giobbi |
| 7,310,042 B2 | 12/2007 | Seifert |
| 7,314,164 B2 | 1/2008 | Bonalle et al. |
| 7,317,799 B2 | 1/2008 | Hammersmith et al. |
| 7,319,395 B2 | 1/2008 | Puzio et al. |
| 7,330,108 B2 | 2/2008 | Thomas |
| 7,333,002 B2 | 2/2008 | Bixler et al. |
| 7,333,615 B1 | 2/2008 | Jarboe et al. |
| 7,336,181 B2 | 2/2008 | Nowak et al. |
| 7,336,182 B1 | 2/2008 | Baranowski et al. |
| 7,337,325 B2 | 2/2008 | Palmer et al. |
| 7,337,326 B2 | 2/2008 | Palmer et al. |
| 7,341,181 B2 | 3/2008 | Bonalle et al. |
| 7,342,503 B1 | 3/2008 | Light et al. |
| 7,349,557 B2 | 3/2008 | Tibor |
| 7,356,393 B1 | 4/2008 | Schlatre et al. |
| 7,356,706 B2 | 4/2008 | Scheurich |
| 7,361,919 B2 | 4/2008 | Setlak |
| 7,363,494 B2 | 4/2008 | Brainard et al. |
| 7,370,366 B2 | 5/2008 | Lacan et al. |
| 7,378,939 B2 | 5/2008 | Sengupta et al. |
| 7,380,202 B1 | 5/2008 | Lindhorst et al. |
| 7,382,799 B1 | 6/2008 | Young et al. |
| 7,387,235 B2 | 6/2008 | Gilbert et al. |
| 7,401,731 B1 | 7/2008 | Pletz et al. |
| 7,424,134 B2 | 9/2008 | Chou |
| 7,437,330 B1 | 10/2008 | Robinson et al. |
| 7,447,911 B2 | 11/2008 | Chou et al. |
| 7,448,087 B2 | 11/2008 | Ohmori et al. |
| 7,458,510 B1 | 12/2008 | Zhou |
| 7,460,836 B2 | 12/2008 | Smith et al. |
| 7,461,444 B2 | 12/2008 | Deaett et al. |
| 7,464,053 B1 | 12/2008 | Pylant |
| 7,464,059 B1 | 12/2008 | Robinson et al. |
| 7,466,232 B2 | 12/2008 | Neuwirth |
| 7,472,280 B2 | 12/2008 | Giobbi |
| 7,512,806 B2 | 3/2009 | Lemke |
| 7,525,413 B2 | 4/2009 | Jung et al. |
| 7,529,944 B2 | 5/2009 | Hamid |
| 7,533,809 B1 | 5/2009 | Robinson et al. |
| 7,545,312 B2 | 6/2009 | Kiang et al. |
| 7,565,329 B2 | 7/2009 | Lapsley et al. |

(56) References Cited

U.S. PATENT DOCUMENTS

| | | |
|---|---|---|
| 7,573,382 B2 | 8/2009 | Choubey et al. |
| 7,573,841 B2 | 8/2009 | Lee et al. |
| 7,574,734 B2 | 8/2009 | Fedronic et al. |
| 7,583,238 B2 | 9/2009 | Cassen et al. |
| 7,583,643 B2 | 9/2009 | Smith et al. |
| 7,587,502 B2 | 9/2009 | Crawford et al. |
| 7,587,611 B2 | 9/2009 | Johnson et al. |
| 7,594,611 B1 | 9/2009 | Arrington, III |
| 7,595,765 B1 | 9/2009 | Hirsch et al. |
| 7,603,564 B2 | 10/2009 | Adachi |
| 7,606,733 B2 | 10/2009 | Shmueli et al. |
| 7,617,523 B2 | 11/2009 | Das et al. |
| 7,620,184 B2 | 11/2009 | Marque Pucheu |
| 7,624,073 B1 | 11/2009 | Robinson et al. |
| 7,624,417 B2 | 11/2009 | Dua |
| 7,640,273 B2 | 12/2009 | Wallmeier et al. |
| 7,644,443 B2 | 1/2010 | Matsuyama et al. |
| 7,646,307 B2 | 1/2010 | Plocher et al. |
| 7,652,892 B2 | 1/2010 | Shiu et al. |
| 7,676,380 B2 | 3/2010 | Graves et al. |
| 7,689,005 B2 | 3/2010 | Wang et al. |
| 7,706,896 B2 | 4/2010 | Music et al. |
| 7,711,152 B1 | 5/2010 | Davida et al. |
| 7,711,586 B2 | 5/2010 | Aggarwal et al. |
| 7,715,593 B1 | 5/2010 | Adams et al. |
| 7,724,713 B2 | 5/2010 | Del Prado Pavon et al. |
| 7,724,717 B2 | 5/2010 | Porras et al. |
| 7,724,720 B2 | 5/2010 | Korpela et al. |
| 7,764,236 B2 | 7/2010 | Hill et al. |
| 7,765,164 B1 | 7/2010 | Robinson et al. |
| 7,765,181 B2 | 7/2010 | Thomas et al. |
| 7,773,754 B2 | 8/2010 | Buer et al. |
| 7,774,613 B2 | 8/2010 | Lemke |
| 7,780,082 B2 | 8/2010 | Handa et al. |
| 7,796,551 B1 | 9/2010 | Machiraju et al. |
| 7,813,822 B1 | 10/2010 | Hoffberg |
| 7,865,448 B2 | 1/2011 | Pizarro |
| 7,865,937 B1 | 1/2011 | White et al. |
| 7,883,417 B2 | 2/2011 | Bruzzese et al. |
| 7,904,718 B2 | 3/2011 | Giobbi et al. |
| 7,943,868 B2 | 5/2011 | Anders et al. |
| 7,957,536 B2 | 6/2011 | Nolte |
| 7,961,078 B1 | 6/2011 | Reynolds et al. |
| 7,984,064 B2 | 7/2011 | Fusari |
| 7,996,514 B2 | 8/2011 | Baumert et al. |
| 8,026,821 B2 | 9/2011 | Reeder et al. |
| 8,036,152 B2 | 10/2011 | Brown et al. |
| 8,077,041 B2 | 12/2011 | Stern et al. |
| 8,081,215 B2 | 12/2011 | Kuo et al. |
| 8,082,160 B2 | 12/2011 | Collins, Jr. et al. |
| 8,089,354 B2 | 1/2012 | Perkins |
| 8,112,066 B2 | 2/2012 | Ben Ayed |
| 8,125,624 B2 | 2/2012 | Jones et al. |
| 8,135,624 B1 | 3/2012 | Ramalingam et al. |
| 8,171,528 B1 | 5/2012 | Brown |
| 8,193,923 B2 | 6/2012 | Rork et al. |
| 8,200,980 B1 | 6/2012 | Robinson et al. |
| 8,215,552 B1 | 7/2012 | Rambadt |
| 8,248,263 B2 | 8/2012 | Shervey et al. |
| 8,258,942 B1 | 9/2012 | Lanzone et al. |
| 8,294,554 B2 | 10/2012 | Shoarinejad et al. |
| 8,296,573 B2 | 10/2012 | Bolle et al. |
| 8,307,414 B2 | 11/2012 | Zerfos et al. |
| 8,325,011 B2 | 12/2012 | Butler et al. |
| 8,340,672 B2 | 12/2012 | Brown et al. |
| 8,352,730 B2 | 1/2013 | Giobbi |
| 8,373,562 B1 | 2/2013 | Heinze et al. |
| 8,387,124 B2 | 2/2013 | Smetters et al. |
| 8,390,456 B2 | 3/2013 | Puleston et al. |
| 8,395,484 B2 | 3/2013 | Fullerton |
| 8,410,906 B1 | 4/2013 | Dacus et al. |
| 8,421,606 B2 | 4/2013 | Collins, Jr. et al. |
| 8,424,079 B2 | 4/2013 | Adams et al. |
| 8,432,262 B2 | 4/2013 | Talty et al. |
| 8,433,919 B2 | 4/2013 | Giobbi et al. |
| 8,448,858 B1 | 5/2013 | Kundu et al. |
| 8,473,748 B2 | 6/2013 | Sampas |
| 8,484,696 B2 | 7/2013 | Gatto et al. |
| 8,494,576 B1 | 7/2013 | Bye et al. |
| 8,508,336 B2 | 8/2013 | Giobbi et al. |
| 8,511,555 B2 | 8/2013 | Babcock et al. |
| 8,519,823 B2 | 8/2013 | Rinkes |
| 8,522,019 B2 | 8/2013 | Michaelis |
| 8,558,699 B2 | 10/2013 | Butler et al. |
| 8,572,391 B2 | 10/2013 | Golan et al. |
| 8,577,091 B2 | 11/2013 | Ivanov et al. |
| 8,646,042 B1 | 2/2014 | Brown |
| 8,678,273 B2 | 3/2014 | McNeal |
| 8,717,346 B2 | 5/2014 | Claessen |
| 8,738,925 B1 | 5/2014 | Park et al. |
| 8,799,574 B2 | 8/2014 | Corda |
| 8,856,539 B2 | 10/2014 | Weiss |
| 8,914,477 B2 | 12/2014 | Gammon |
| 8,918,854 B1 | 12/2014 | Giobbi |
| 8,931,698 B2 | 1/2015 | Ishikawa et al. |
| 8,979,646 B2 | 3/2015 | Moser et al. |
| 9,037,140 B1 | 5/2015 | Brown |
| 9,049,188 B1 | 6/2015 | Brown |
| 9,165,233 B2 | 10/2015 | Testanero |
| 9,189,788 B1 | 11/2015 | Robinson et al. |
| 9,230,399 B2 | 1/2016 | Yacenda |
| 9,235,700 B1 | 1/2016 | Brown |
| 9,276,914 B2 | 3/2016 | Woodward et al. |
| 9,305,312 B2 | 4/2016 | Kountotsis et al. |
| 9,405,898 B2 | 8/2016 | Giobbi |
| 9,418,205 B2 | 8/2016 | Giobbi |
| 9,542,542 B2 | 1/2017 | Giobbi et al. |
| 9,679,289 B1 | 6/2017 | Brown |
| 9,830,504 B2 | 11/2017 | Masood et al. |
| 9,892,250 B2 | 2/2018 | Giobbi |
| 10,073,960 B1 | 9/2018 | Brown |
| 10,110,385 B1 | 10/2018 | Rush et al. |
| 10,455,533 B2 | 10/2019 | Brown |
| 10,817,964 B2 | 10/2020 | Guillama et al. |
| 2001/0021950 A1 | 9/2001 | Hawley et al. |
| 2001/0024428 A1 | 9/2001 | Onouchi |
| 2001/0026619 A1 | 10/2001 | Howard, Jr. et al. |
| 2001/0027121 A1 | 10/2001 | Boesen |
| 2001/0027439 A1 | 10/2001 | Holtzman et al. |
| 2001/0044337 A1 | 11/2001 | Rowe et al. |
| 2002/0004783 A1 | 1/2002 | Paltenghe et al. |
| 2002/0007456 A1 | 1/2002 | Peinado et al. |
| 2002/0010679 A1 | 1/2002 | Felsher |
| 2002/0013772 A1 | 1/2002 | Peinado |
| 2002/0014954 A1 | 2/2002 | Fitzgibbon et al. |
| 2002/0015494 A1 | 2/2002 | Nagai et al. |
| 2002/0019811 A1 | 2/2002 | Lapsley et al. |
| 2002/0022455 A1 | 2/2002 | Salokannel et al. |
| 2002/0023032 A1 | 2/2002 | Pearson et al. |
| 2002/0023217 A1 | 2/2002 | Wheeler et al. |
| 2002/0026424 A1 | 2/2002 | Akashi |
| 2002/0037732 A1 | 3/2002 | Gous et al. |
| 2002/0052193 A1 | 5/2002 | Chetty |
| 2002/0055908 A1 | 5/2002 | Di Giorgio et al. |
| 2002/0056043 A1 | 5/2002 | Glass |
| 2002/0059114 A1 | 5/2002 | Cockrill et al. |
| 2002/0062249 A1 | 5/2002 | Iannacci |
| 2002/0068605 A1 | 6/2002 | Stanley |
| 2002/0069364 A1 | 6/2002 | Dosch |
| 2002/0071559 A1 | 6/2002 | Christensen et al. |
| 2002/0073042 A1 | 6/2002 | Maritzen et al. |
| 2002/0080969 A1 | 6/2002 | Giobbi |
| 2002/0083178 A1* | 6/2002 | Brothers .............. G06F 21/10 709/226 |
| 2002/0083318 A1 | 6/2002 | Larose |
| 2002/0086690 A1 | 7/2002 | Takahashi et al. |
| 2002/0089890 A1 | 7/2002 | Fibranz et al. |
| 2002/0091646 A1 | 7/2002 | Lake et al. |
| 2002/0095586 A1 | 7/2002 | Doyle et al. |
| 2002/0095587 A1 | 7/2002 | Doyle et al. |
| 2002/0097876 A1 | 7/2002 | Harrison |
| 2002/0098888 A1 | 7/2002 | Rowe et al. |
| 2002/0100798 A1 | 8/2002 | Farrugia et al. |
| 2002/0103027 A1 | 8/2002 | Rowe et al. |

(56) References Cited

U.S. PATENT DOCUMENTS

| | | |
|---|---|---|
| 2002/0103881 A1 | 8/2002 | Granade et al. |
| 2002/0104006 A1 | 8/2002 | Boate et al. |
| 2002/0104019 A1 | 8/2002 | Chatani et al. |
| 2002/0105918 A1 | 8/2002 | Yamada et al. |
| 2002/0108049 A1 | 8/2002 | Xu et al. |
| 2002/0109580 A1 | 8/2002 | Shreve et al. |
| 2002/0111919 A1 | 8/2002 | Weller et al. |
| 2002/0112183 A1 | 8/2002 | Baird et al. |
| 2002/0116615 A1 | 8/2002 | Nguyen et al. |
| 2002/0124251 A1 | 9/2002 | Hunter et al. |
| 2002/0128017 A1 | 9/2002 | Virtanen |
| 2002/0129262 A1 | 9/2002 | Kutaragi et al. |
| 2002/0138438 A1 | 9/2002 | Bardwell |
| 2002/0138767 A1 | 9/2002 | Hamid et al. |
| 2002/0140542 A1 | 10/2002 | Prokoski et al. |
| 2002/0141586 A1 | 10/2002 | Margalit et al. |
| 2002/0143623 A1 | 10/2002 | Dayley |
| 2002/0143655 A1 | 10/2002 | Elston et al. |
| 2002/0144117 A1 | 10/2002 | Faigle |
| 2002/0147653 A1 | 10/2002 | Shmueli et al. |
| 2002/0148892 A1 | 10/2002 | Bardwell |
| 2002/0150282 A1 | 10/2002 | Kinsella |
| 2002/0152391 A1 | 10/2002 | Willins et al. |
| 2002/0153996 A1 | 10/2002 | Chan et al. |
| 2002/0158121 A1 | 10/2002 | Stanford-Clark |
| 2002/0158750 A1 | 10/2002 | Almalik |
| 2002/0158765 A1 | 10/2002 | Pape et al. |
| 2002/0160820 A1 | 10/2002 | Winkler |
| 2002/0174348 A1 | 11/2002 | Ting |
| 2002/0177460 A1 | 11/2002 | Beasley et al. |
| 2002/0178063 A1 | 11/2002 | Gravelle et al. |
| 2002/0184208 A1 | 12/2002 | Kato |
| 2002/0187746 A1 | 12/2002 | Cheng et al. |
| 2002/0191816 A1 | 12/2002 | Maritzen et al. |
| 2002/0196963 A1 | 12/2002 | Bardwell |
| 2002/0199120 A1 | 12/2002 | Schmidt |
| 2003/0022701 A1 | 1/2003 | Gupta |
| 2003/0034877 A1 | 2/2003 | Miller et al. |
| 2003/0036416 A1 | 2/2003 | Pattabiraman et al. |
| 2003/0036425 A1 | 2/2003 | Kaminkow et al. |
| 2003/0046228 A1 | 3/2003 | Berney |
| 2003/0046237 A1 | 3/2003 | Uberti |
| 2003/0046552 A1 | 3/2003 | Hamid |
| 2003/0048174 A1 | 3/2003 | Stevens et al. |
| 2003/0051173 A1 | 3/2003 | Krueger |
| 2003/0054868 A1 | 3/2003 | Paulsen et al. |
| 2003/0054881 A1 | 3/2003 | Hedrick et al. |
| 2003/0055689 A1 | 3/2003 | Block et al. |
| 2003/0061172 A1 | 3/2003 | Robinson |
| 2003/0063619 A1 | 4/2003 | Montano et al. |
| 2003/0079133 A1 | 4/2003 | Breiter et al. |
| 2003/0087601 A1 | 5/2003 | Agam et al. |
| 2003/0088441 A1 | 5/2003 | McNerney |
| 2003/0105719 A1 | 6/2003 | Berger et al. |
| 2003/0109274 A1 | 6/2003 | Budka et al. |
| 2003/0115351 A1 | 6/2003 | Giobbi |
| 2003/0115474 A1 | 6/2003 | Khan et al. |
| 2003/0117969 A1 | 6/2003 | Koo et al. |
| 2003/0117980 A1 | 6/2003 | Kim et al. |
| 2003/0120934 A1 | 6/2003 | Ortiz |
| 2003/0127511 A1 | 7/2003 | Kelly et al. |
| 2003/0128866 A1 | 7/2003 | McNeal |
| 2003/0137404 A1 | 7/2003 | Bonneau, Jr. et al. |
| 2003/0139190 A1 | 7/2003 | Steelberg et al. |
| 2003/0146835 A1 | 8/2003 | Carter |
| 2003/0149744 A1 | 8/2003 | Bierre et al. |
| 2003/0156742 A1 | 8/2003 | Witt et al. |
| 2003/0159040 A1 | 8/2003 | Hashimoto et al. |
| 2003/0163388 A1 | 8/2003 | Beane |
| 2003/0167207 A1 | 9/2003 | Berardi et al. |
| 2003/0169697 A1 | 9/2003 | Suzuki et al. |
| 2003/0172028 A1 | 9/2003 | Abell et al. |
| 2003/0172037 A1 | 9/2003 | Jung et al. |
| 2003/0174839 A1 | 9/2003 | Yamagata et al. |
| 2003/0176218 A1 | 9/2003 | LeMay et al. |
| 2003/0177102 A1 | 9/2003 | Timothy |
| 2003/0186739 A1 | 10/2003 | Paulsen et al. |
| 2003/0195842 A1 | 10/2003 | Reece |
| 2003/0199267 A1 | 10/2003 | Iwasa et al. |
| 2003/0204526 A1 | 10/2003 | Salehi-Had |
| 2003/0213840 A1 | 11/2003 | Livingston et al. |
| 2003/0223394 A1 | 12/2003 | Parantainen et al. |
| 2003/0225703 A1 | 12/2003 | Angel |
| 2003/0226031 A1 | 12/2003 | Proudler et al. |
| 2003/0233458 A1 | 12/2003 | Kwon et al. |
| 2004/0002347 A1 | 1/2004 | Hoctor et al. |
| 2004/0015403 A1 | 1/2004 | Moskowitz et al. |
| 2004/0022384 A1 | 2/2004 | Flores et al. |
| 2004/0029620 A1 | 2/2004 | Karaoguz |
| 2004/0029635 A1 | 2/2004 | Giobbi |
| 2004/0030764 A1 | 2/2004 | Birk et al. |
| 2004/0030894 A1 | 2/2004 | Labrou et al. |
| 2004/0035644 A1 | 2/2004 | Ford et al. |
| 2004/0039909 A1 | 2/2004 | Cheng |
| 2004/0048570 A1 | 3/2004 | Oba et al. |
| 2004/0048609 A1 | 3/2004 | Kosaka |
| 2004/0059682 A1 | 3/2004 | Hasumi et al. |
| 2004/0059912 A1 | 3/2004 | Zizzi |
| 2004/0064728 A1 | 4/2004 | Scheurich |
| 2004/0068656 A1 | 4/2004 | Lu |
| 2004/0073792 A1 | 4/2004 | Noble et al. |
| 2004/0081127 A1 | 4/2004 | Gardner et al. |
| 2004/0082385 A1 | 4/2004 | Silva et al. |
| 2004/0090345 A1 | 5/2004 | Hitt |
| 2004/0098597 A1 | 5/2004 | Giobbi |
| 2004/0114563 A1 | 6/2004 | Shvodian |
| 2004/0117644 A1 | 6/2004 | Colvin |
| 2004/0123106 A1 | 6/2004 | D'Angelo et al. |
| 2004/0123127 A1 | 6/2004 | Teicher et al. |
| 2004/0127277 A1 | 7/2004 | Walker et al. |
| 2004/0128162 A1 | 7/2004 | Schlotterbeck et al. |
| 2004/0128389 A1 | 7/2004 | Kopchik |
| 2004/0128500 A1 | 7/2004 | Cihula et al. |
| 2004/0128508 A1 | 7/2004 | Wheeler et al. |
| 2004/0128519 A1 | 7/2004 | Klinger et al. |
| 2004/0129787 A1 | 7/2004 | Saito et al. |
| 2004/0132432 A1 | 7/2004 | Moores et al. |
| 2004/0137912 A1 | 7/2004 | Lin |
| 2004/0158746 A1 | 8/2004 | Hu et al. |
| 2004/0166875 A1 | 8/2004 | Jenkins et al. |
| 2004/0167465 A1 | 8/2004 | Mihai et al. |
| 2004/0181695 A1 | 9/2004 | Walker |
| 2004/0193925 A1 | 9/2004 | Safriel |
| 2004/0194133 A1 | 9/2004 | Ikeda et al. |
| 2004/0203566 A1 | 10/2004 | Leung |
| 2004/0203923 A1 | 10/2004 | Mullen |
| 2004/0208139 A1 | 10/2004 | Iwamura |
| 2004/0209690 A1 | 10/2004 | Bruzzese et al. |
| 2004/0209692 A1 | 10/2004 | Schober et al. |
| 2004/0214582 A1 | 10/2004 | Lan et al. |
| 2004/0215615 A1 | 10/2004 | Larsson et al. |
| 2004/0217859 A1 | 11/2004 | Pucci et al. |
| 2004/0218581 A1 | 11/2004 | Cattaneo |
| 2004/0222877 A1 | 11/2004 | Teramura et al. |
| 2004/0230488 A1 | 11/2004 | Beenau et al. |
| 2004/0230809 A1 | 11/2004 | Lowensohn et al. |
| 2004/0234117 A1 | 11/2004 | Tibor |
| 2004/0243519 A1 | 12/2004 | Perttila et al. |
| 2004/0246103 A1 | 12/2004 | Zukowski |
| 2004/0246950 A1 | 12/2004 | Parker et al. |
| 2004/0250074 A1 | 12/2004 | Kilian-Kehr |
| 2004/0252012 A1 | 12/2004 | Beenau et al. |
| 2004/0252659 A1 | 12/2004 | Yun et al. |
| 2004/0253996 A1 | 12/2004 | Chen et al. |
| 2004/0254837 A1 | 12/2004 | Roshkoff |
| 2004/0255139 A1* | 12/2004 | Giobbi ............... H04N 21/4104 713/193 |
| 2004/0255145 A1 | 12/2004 | Chow |
| 2005/0001028 A1 | 1/2005 | Zuili |
| 2005/0002028 A1 | 1/2005 | Kasapi et al. |
| 2005/0005136 A1 | 1/2005 | Chen et al. |
| 2005/0006452 A1 | 1/2005 | Aupperle et al. |
| 2005/0009517 A1 | 1/2005 | Maes |
| 2005/0021561 A1 | 1/2005 | Noonan |

(56) References Cited

U.S. PATENT DOCUMENTS

| | | |
|---|---|---|
| 2005/0025093 A1 | 2/2005 | Yun et al. |
| 2005/0028168 A1 | 2/2005 | Marcjan |
| 2005/0035897 A1 | 2/2005 | Perl et al. |
| 2005/0039027 A1 | 2/2005 | Shapiro |
| 2005/0040961 A1 | 2/2005 | Tuttle |
| 2005/0044372 A1 | 2/2005 | Aull et al. |
| 2005/0044387 A1 | 2/2005 | Ozolins |
| 2005/0047386 A1 | 3/2005 | Yi |
| 2005/0049013 A1 | 3/2005 | Chang et al. |
| 2005/0050208 A1 | 3/2005 | Chatani |
| 2005/0050324 A1 | 3/2005 | Corbett et al. |
| 2005/0054431 A1 | 3/2005 | Walker et al. |
| 2005/0055242 A1 | 3/2005 | Bello et al. |
| 2005/0055244 A1 | 3/2005 | Mullan et al. |
| 2005/0058292 A1 | 3/2005 | Diorio et al. |
| 2005/0074126 A1 | 4/2005 | Stanko |
| 2005/0076242 A1 | 4/2005 | Breuer |
| 2005/0081040 A1 | 4/2005 | Johnson et al. |
| 2005/0084137 A1 | 4/2005 | Kim et al. |
| 2005/0086115 A1 | 4/2005 | Pearson |
| 2005/0086515 A1 | 4/2005 | Paris |
| 2005/0089000 A1 | 4/2005 | Bae et al. |
| 2005/0090200 A1 | 4/2005 | Karaoguz et al. |
| 2005/0091338 A1 | 4/2005 | de la Huerga |
| 2005/0091553 A1 | 4/2005 | Chien et al. |
| 2005/0094657 A1 | 5/2005 | Sung et al. |
| 2005/0097037 A1 | 5/2005 | Tibor |
| 2005/0105600 A1 | 5/2005 | Culum et al. |
| 2005/0105734 A1 | 5/2005 | Buer et al. |
| 2005/0108164 A1 | 5/2005 | Salafia, III et al. |
| 2005/0109836 A1 | 5/2005 | Ben-Aissa |
| 2005/0109841 A1 | 5/2005 | Ryan et al. |
| 2005/0113070 A1 | 5/2005 | Okabe |
| 2005/0114149 A1 | 5/2005 | Rodriguez et al. |
| 2005/0114150 A1 | 5/2005 | Franklin |
| 2005/0116020 A1 | 6/2005 | Smolucha et al. |
| 2005/0117530 A1 | 6/2005 | Abraham et al. |
| 2005/0119979 A1 | 6/2005 | Murashita et al. |
| 2005/0124294 A1 | 6/2005 | Wentink |
| 2005/0125258 A1 | 6/2005 | Yellin et al. |
| 2005/0137977 A1 | 6/2005 | Wankmuellerjohn |
| 2005/0138390 A1 | 6/2005 | Adams et al. |
| 2005/0138576 A1 | 6/2005 | Baumert et al. |
| 2005/0139656 A1 | 6/2005 | Arnouse |
| 2005/0141451 A1 | 6/2005 | Yoon et al. |
| 2005/0152394 A1 | 7/2005 | Cho |
| 2005/0154897 A1 | 7/2005 | Holloway et al. |
| 2005/0161503 A1 | 7/2005 | Remery et al. |
| 2005/0165684 A1 | 7/2005 | Jensen et al. |
| 2005/0166063 A1 | 7/2005 | Huang |
| 2005/0167482 A1 | 8/2005 | Ramachandran et al. |
| 2005/0169292 A1 | 8/2005 | Young |
| 2005/0177716 A1 | 8/2005 | Ginter et al. |
| 2005/0180385 A1 | 8/2005 | Jeong et al. |
| 2005/0182661 A1 | 8/2005 | Allard et al. |
| 2005/0182975 A1 | 8/2005 | Guo et al. |
| 2005/0187792 A1 | 8/2005 | Harper |
| 2005/0192748 A1 | 9/2005 | Andric et al. |
| 2005/0195975 A1 | 9/2005 | Kawakita |
| 2005/0200453 A1 | 9/2005 | Turner et al. |
| 2005/0201389 A1 | 9/2005 | Shimanuki et al. |
| 2005/0203682 A1 | 9/2005 | Omino et al. |
| 2005/0203844 A1* | 9/2005 | Ferguson ............ G06F 16/9535 705/40 |
| 2005/0210270 A1 | 9/2005 | Rohatgi et al. |
| 2005/0212657 A1 | 9/2005 | Simon |
| 2005/0215233 A1 | 9/2005 | Perera et al. |
| 2005/0216313 A1 | 9/2005 | Claud et al. |
| 2005/0216639 A1 | 9/2005 | Sparer et al. |
| 2005/0218215 A1 | 10/2005 | Lauden |
| 2005/0220046 A1 | 10/2005 | Falck et al. |
| 2005/0221869 A1 | 10/2005 | Liu et al. |
| 2005/0229007 A1 | 10/2005 | Bolle et al. |
| 2005/0229240 A1 | 10/2005 | Nanba |
| 2005/0242921 A1 | 11/2005 | Zimmerman et al. |
| 2005/0243787 A1 | 11/2005 | Hong et al. |
| 2005/0249385 A1 | 11/2005 | Kondo et al. |
| 2005/0251688 A1 | 11/2005 | Nanavati et al. |
| 2005/0253683 A1 | 11/2005 | Lowe |
| 2005/0257102 A1 | 11/2005 | Moyer et al. |
| 2005/0264416 A1 | 12/2005 | Maurer |
| 2005/0268111 A1 | 12/2005 | Markham |
| 2005/0269401 A1 | 12/2005 | Spitzer et al. |
| 2005/0272403 A1 | 12/2005 | Ryu et al. |
| 2005/0281320 A1 | 12/2005 | Neugebauer |
| 2005/0282558 A1 | 12/2005 | Choi et al. |
| 2005/0284932 A1 | 12/2005 | Sukeda et al. |
| 2005/0287985 A1 | 12/2005 | Balfanz et al. |
| 2005/0288069 A1 | 12/2005 | Arunan et al. |
| 2005/0289473 A1 | 12/2005 | Gustafson et al. |
| 2006/0001525 A1 | 1/2006 | Nitzan et al. |
| 2006/0014430 A1 | 1/2006 | Liang et al. |
| 2006/0022042 A1 | 2/2006 | Smets et al. |
| 2006/0022046 A1 | 2/2006 | Iwamura |
| 2006/0022800 A1 | 2/2006 | Krishna et al. |
| 2006/0025180 A1 | 2/2006 | Rajkotia et al. |
| 2006/0026673 A1 | 2/2006 | Tsuchida |
| 2006/0030279 A1 | 2/2006 | Michael |
| 2006/0030353 A1 | 2/2006 | Jun |
| 2006/0034250 A1 | 2/2006 | Kim et al. |
| 2006/0041746 A1 | 2/2006 | Kirkup et al. |
| 2006/0046664 A1 | 3/2006 | Paradiso et al. |
| 2006/0058102 A1 | 3/2006 | Nguyen et al. |
| 2006/0063575 A1 | 3/2006 | Gatto et al. |
| 2006/0069814 A1 | 3/2006 | Abraham et al. |
| 2006/0072586 A1 | 4/2006 | Callaway, Jr. et al. |
| 2006/0074713 A1 | 4/2006 | Conry et al. |
| 2006/0076401 A1 | 4/2006 | Frerking |
| 2006/0078176 A1 | 4/2006 | Abiko et al. |
| 2006/0087407 A1 | 4/2006 | Stewart et al. |
| 2006/0089138 A1 | 4/2006 | Smith et al. |
| 2006/0097949 A1 | 5/2006 | Luebke et al. |
| 2006/0110012 A1 | 5/2006 | Ritter |
| 2006/0111955 A1 | 5/2006 | Winter et al. |
| 2006/0113381 A1 | 6/2006 | Hochstein et al. |
| 2006/0116935 A1 | 6/2006 | Evans |
| 2006/0117013 A1* | 6/2006 | Wada ............... G06F 21/10 |
| 2006/0120287 A1 | 6/2006 | Foti et al. |
| 2006/0129838 A1 | 6/2006 | Chen et al. |
| 2006/0136728 A1 | 6/2006 | Gentry et al. |
| 2006/0136742 A1 | 6/2006 | Giobbi |
| 2006/0143441 A1 | 6/2006 | Giobbi |
| 2006/0144943 A1 | 7/2006 | Kim |
| 2006/0156027 A1 | 7/2006 | Blake |
| 2006/0158308 A1 | 7/2006 | McMullen et al. |
| 2006/0163349 A1 | 7/2006 | Neugebauer |
| 2006/0165060 A1 | 7/2006 | Dua |
| 2006/0169771 A1 | 8/2006 | Brookner |
| 2006/0170530 A1 | 8/2006 | Nwosu et al. |
| 2006/0170565 A1 | 8/2006 | Husak et al. |
| 2006/0172700 A1 | 8/2006 | Wu |
| 2006/0173846 A1 | 8/2006 | Omae et al. |
| 2006/0173991 A1 | 8/2006 | Piikivi |
| 2006/0183426 A1 | 8/2006 | Graves et al. |
| 2006/0183462 A1 | 8/2006 | Kolehmainen |
| 2006/0184795 A1 | 8/2006 | Doradla et al. |
| 2006/0185005 A1 | 8/2006 | Graves et al. |
| 2006/0187029 A1 | 8/2006 | Thomas |
| 2006/0190348 A1 | 8/2006 | Ofer et al. |
| 2006/0190413 A1 | 8/2006 | Harper |
| 2006/0194598 A1 | 8/2006 | Kim et al. |
| 2006/0195576 A1 | 8/2006 | Rinne et al. |
| 2006/0198337 A1 | 9/2006 | Hoang et al. |
| 2006/0200467 A1 | 9/2006 | Ohmori et al. |
| 2006/0205408 A1 | 9/2006 | Nakagawa et al. |
| 2006/0208066 A1 | 9/2006 | Finn et al. |
| 2006/0208853 A1 | 9/2006 | Kung et al. |
| 2006/0222042 A1 | 10/2006 | Teramura et al. |
| 2006/0226950 A1 | 10/2006 | Kanou et al. |
| 2006/0229909 A1 | 10/2006 | Kaila et al. |
| 2006/0236373 A1 | 10/2006 | Graves et al. |
| 2006/0237528 A1 | 10/2006 | Bishop et al. |
| 2006/0238305 A1 | 10/2006 | Loving et al. |
| 2006/0268891 A1 | 11/2006 | Heidari-Bateni et al. |

(56) References Cited

U.S. PATENT DOCUMENTS

| | | |
|---|---|---|
| 2006/0273176 A1 | 12/2006 | Audebert et al. |
| 2006/0274711 A1 | 12/2006 | Nelson, Jr. et al. |
| 2006/0279412 A1 | 12/2006 | Holland et al. |
| 2006/0286969 A1 | 12/2006 | Talmor et al. |
| 2006/0288095 A1 | 12/2006 | Torok et al. |
| 2006/0288233 A1 | 12/2006 | Kozlay |
| 2006/0290580 A1 | 12/2006 | Noro et al. |
| 2006/0293925 A1 | 12/2006 | Flom |
| 2006/0294388 A1 | 12/2006 | Abraham et al. |
| 2007/0003111 A1 | 1/2007 | Awatsu et al. |
| 2007/0005403 A1 | 1/2007 | Kennedy et al. |
| 2007/0007331 A1 | 1/2007 | Jasper et al. |
| 2007/0008070 A1 | 1/2007 | Friedrich |
| 2007/0008916 A1 | 1/2007 | Haugli et al. |
| 2007/0011724 A1* | 1/2007 | Gonzalez ............... G06F 21/79 726/4 |
| 2007/0016800 A1 | 1/2007 | Spottswood et al. |
| 2007/0019845 A1 | 1/2007 | Kato |
| 2007/0029381 A1 | 2/2007 | Braiman |
| 2007/0032225 A1 | 2/2007 | Konicek et al. |
| 2007/0032288 A1 | 2/2007 | Nelson et al. |
| 2007/0033072 A1 | 2/2007 | Bildirici |
| 2007/0033150 A1 | 2/2007 | Nwosu |
| 2007/0036396 A1 | 2/2007 | Sugita et al. |
| 2007/0038751 A1 | 2/2007 | Jorgensen |
| 2007/0043594 A1 | 2/2007 | Lavergne |
| 2007/0050259 A1 | 3/2007 | Wesley |
| 2007/0050398 A1* | 3/2007 | Mochizuki ............ G06F 16/168 |
| 2007/0051794 A1 | 3/2007 | Glanz et al. |
| 2007/0051798 A1* | 3/2007 | Kawai ................. G06F 21/6209 235/382 |
| 2007/0055630 A1 | 3/2007 | Gauthier et al. |
| 2007/0060095 A1 | 3/2007 | Subrahmanya et al. |
| 2007/0060319 A1 | 3/2007 | Block et al. |
| 2007/0064742 A1 | 3/2007 | Shvodian |
| 2007/0069852 A1 | 3/2007 | Mo et al. |
| 2007/0070040 A1 | 3/2007 | Chen et al. |
| 2007/0072636 A1 | 3/2007 | Worfolk et al. |
| 2007/0073553 A1 | 3/2007 | Flinn et al. |
| 2007/0084523 A1 | 4/2007 | McLean et al. |
| 2007/0084913 A1 | 4/2007 | Weston |
| 2007/0087682 A1 | 4/2007 | DaCosta |
| 2007/0087834 A1 | 4/2007 | Moser et al. |
| 2007/0100507 A1 | 5/2007 | Simon |
| 2007/0100939 A1 | 5/2007 | Bagley et al. |
| 2007/0109117 A1 | 5/2007 | Heitzmann et al. |
| 2007/0112676 A1 | 5/2007 | Kontio et al. |
| 2007/0118891 A1 | 5/2007 | Buer |
| 2007/0120643 A1 | 5/2007 | Lee |
| 2007/0132586 A1 | 6/2007 | Plocher et al. |
| 2007/0133478 A1 | 6/2007 | Armbruster et al. |
| 2007/0136407 A1 | 6/2007 | Rudelic |
| 2007/0142032 A1 | 6/2007 | Balsillie |
| 2007/0152826 A1 | 7/2007 | August et al. |
| 2007/0156850 A1 | 7/2007 | Corrion |
| 2007/0157249 A1 | 7/2007 | Cordray et al. |
| 2007/0158411 A1 | 7/2007 | Krieg, Jr. |
| 2007/0159301 A1 | 7/2007 | Hirt et al. |
| 2007/0159994 A1 | 7/2007 | Brown et al. |
| 2007/0164847 A1 | 7/2007 | Crawford et al. |
| 2007/0169121 A1 | 7/2007 | Hunt et al. |
| 2007/0174809 A1 | 7/2007 | Brown et al. |
| 2007/0176756 A1 | 8/2007 | Friedrich |
| 2007/0176778 A1 | 8/2007 | Ando et al. |
| 2007/0180047 A1 | 8/2007 | Dong et al. |
| 2007/0187266 A1 | 8/2007 | Porter et al. |
| 2007/0192601 A1 | 8/2007 | Spain et al. |
| 2007/0194882 A1 | 8/2007 | Yokota et al. |
| 2007/0198436 A1 | 8/2007 | Weiss |
| 2007/0204078 A1 | 8/2007 | Boccon-Gibod et al. |
| 2007/0205860 A1 | 9/2007 | Jones et al. |
| 2007/0205861 A1 | 9/2007 | Nair et al. |
| 2007/0213048 A1 | 9/2007 | Trauberg |
| 2007/0214492 A1 | 9/2007 | Gopi et al. |
| 2007/0218921 A1 | 9/2007 | Lee et al. |
| 2007/0219926 A1 | 9/2007 | Korn |
| 2007/0220272 A1 | 9/2007 | Campisi et al. |
| 2007/0229268 A1 | 10/2007 | Swan et al. |
| 2007/0245157 A1 | 10/2007 | Giobbi et al. |
| 2007/0245158 A1 | 10/2007 | Giobbi et al. |
| 2007/0247366 A1 | 10/2007 | Smith et al. |
| 2007/0258626 A1 | 11/2007 | Reiner |
| 2007/0260883 A1 | 11/2007 | Giobbi et al. |
| 2007/0260888 A1 | 11/2007 | Giobbi et al. |
| 2007/0266257 A1 | 11/2007 | Camaisa et al. |
| 2007/0268862 A1 | 11/2007 | Singh et al. |
| 2007/0271194 A1 | 11/2007 | Walker et al. |
| 2007/0271433 A1 | 11/2007 | Takemura |
| 2007/0277044 A1 | 11/2007 | Graf et al. |
| 2007/0280509 A1 | 12/2007 | Owen et al. |
| 2007/0285212 A1 | 12/2007 | Rotzoll |
| 2007/0285238 A1 | 12/2007 | Batra |
| 2007/0288263 A1 | 12/2007 | Rodgers |
| 2007/0288752 A1 | 12/2007 | Chan |
| 2007/0293155 A1 | 12/2007 | Liao et al. |
| 2007/0294755 A1 | 12/2007 | Dadhia et al. |
| 2007/0296544 A1 | 12/2007 | Beenau et al. |
| 2008/0001783 A1 | 1/2008 | Cargonja et al. |
| 2008/0005432 A1 | 1/2008 | Kagawa |
| 2008/0008359 A1 | 1/2008 | Beenau et al. |
| 2008/0011842 A1 | 1/2008 | Curry et al. |
| 2008/0012685 A1 | 1/2008 | Friedrich et al. |
| 2008/0012767 A1 | 1/2008 | Caliri et al. |
| 2008/0016004 A1 | 1/2008 | Kurasaki et al. |
| 2008/0019578 A1 | 1/2008 | Saito et al. |
| 2008/0028227 A1 | 1/2008 | Sakurai |
| 2008/0028453 A1 | 1/2008 | Nguyen et al. |
| 2008/0040609 A1 | 2/2008 | Giobbi |
| 2008/0046366 A1 | 2/2008 | Bemmel et al. |
| 2008/0046715 A1 | 2/2008 | Balazs et al. |
| 2008/0049700 A1 | 2/2008 | Shah et al. |
| 2008/0061941 A1 | 3/2008 | Fischer et al. |
| 2008/0071577 A1 | 3/2008 | Highley |
| 2008/0072063 A1 | 3/2008 | Takahashi et al. |
| 2008/0088475 A1 | 4/2008 | Martin |
| 2008/0090548 A1 | 4/2008 | Ramalingam |
| 2008/0095359 A1 | 4/2008 | Schreyer et al. |
| 2008/0107089 A1 | 5/2008 | Larsson et al. |
| 2008/0109895 A1 | 5/2008 | Janevski |
| 2008/0111752 A1 | 5/2008 | Lindackers et al. |
| 2008/0127176 A1 | 5/2008 | Lee et al. |
| 2008/0129450 A1 | 6/2008 | Riegebauer |
| 2008/0148351 A1 | 6/2008 | Bhatia et al. |
| 2008/0149705 A1 | 6/2008 | Giobbi et al. |
| 2008/0150678 A1 | 6/2008 | Giobbi et al. |
| 2008/0156866 A1 | 7/2008 | McNeal |
| 2008/0164997 A1 | 7/2008 | Aritsuka et al. |
| 2008/0169909 A1 | 7/2008 | Park et al. |
| 2008/0186166 A1 | 8/2008 | Zhou et al. |
| 2008/0188308 A1 | 8/2008 | Shepherd et al. |
| 2008/0195863 A1 | 8/2008 | Kennedy |
| 2008/0201768 A1 | 8/2008 | Koo et al. |
| 2008/0203107 A1 | 8/2008 | Conley et al. |
| 2008/0209571 A1 | 8/2008 | Bhaskar et al. |
| 2008/0218416 A1 | 9/2008 | Handy et al. |
| 2008/0222701 A1 | 9/2008 | Saaranen et al. |
| 2008/0223918 A1 | 9/2008 | Williams et al. |
| 2008/0228524 A1 | 9/2008 | Brown |
| 2008/0235144 A1 | 9/2008 | Phillips |
| 2008/0238625 A1 | 10/2008 | Rofougaran et al. |
| 2008/0250388 A1 | 10/2008 | Meyer et al. |
| 2008/0251579 A1 | 10/2008 | Larsen |
| 2008/0278325 A1 | 11/2008 | Zimman et al. |
| 2008/0289030 A1 | 11/2008 | Poplett |
| 2008/0289032 A1* | 11/2008 | Aoki ...................... G06F 21/33 726/19 |
| 2008/0303637 A1 | 12/2008 | Gelbman et al. |
| 2008/0313728 A1 | 12/2008 | Pandrangi et al. |
| 2008/0314971 A1 | 12/2008 | Faith et al. |
| 2008/0316045 A1 | 12/2008 | Sriharto et al. |
| 2009/0002134 A1 | 1/2009 | McAllister |
| 2009/0013191 A1 | 1/2009 | Popowski |
| 2009/0016573 A1 | 1/2009 | McAfee, II et al. |
| 2009/0024584 A1 | 1/2009 | Dharap et al. |

(56) References Cited

U.S. PATENT DOCUMENTS

| | | |
|---|---|---|
| 2009/0033464 A1 | 2/2009 | Friedrich |
| 2009/0033485 A1 | 2/2009 | Naeve et al. |
| 2009/0036164 A1 | 2/2009 | Rowley |
| 2009/0041309 A1 | 2/2009 | Kim et al. |
| 2009/0045916 A1 | 2/2009 | Nitzan et al. |
| 2009/0052389 A1 | 2/2009 | Qin et al. |
| 2009/0070146 A1 | 3/2009 | Haider et al. |
| 2009/0076849 A1 | 3/2009 | Diller |
| 2009/0081996 A1 | 3/2009 | Duggal et al. |
| 2009/0096580 A1 | 4/2009 | Paananen |
| 2009/0125401 A1 | 5/2009 | Beenau et al. |
| 2009/0140045 A1 | 6/2009 | Evans |
| 2009/0157512 A1 | 6/2009 | King |
| 2009/0176566 A1 | 7/2009 | Kelly |
| 2009/0177495 A1 | 7/2009 | Abousy et al. |
| 2009/0199206 A1 | 8/2009 | Finkenzeller et al. |
| 2009/0237245 A1 | 9/2009 | Brinton et al. |
| 2009/0237253 A1 | 9/2009 | Neuwirth |
| 2009/0239667 A1 | 9/2009 | Rowe et al. |
| 2009/0253516 A1 | 10/2009 | Hartmann et al. |
| 2009/0254971 A1 | 10/2009 | Herz et al. |
| 2009/0264712 A1 | 10/2009 | Baldus et al. |
| 2009/0310514 A1 | 12/2009 | Jeon et al. |
| 2009/0313689 A1 | 12/2009 | Nyström et al. |
| 2009/0319788 A1 | 12/2009 | Zick et al. |
| 2009/0320118 A1 | 12/2009 | Müller et al. |
| 2009/0322510 A1 | 12/2009 | Berger et al. |
| 2009/0328182 A1 | 12/2009 | Malakapalli et al. |
| 2010/0005526 A1 | 1/2010 | Tsuji et al. |
| 2010/0007498 A1 | 1/2010 | Jackson |
| 2010/0022308 A1 | 1/2010 | Hartmann et al. |
| 2010/0023074 A1 | 1/2010 | Powers et al. |
| 2010/0037255 A1 | 2/2010 | Sheehan et al. |
| 2010/0062743 A1 | 3/2010 | Jonsson |
| 2010/0077214 A1 | 3/2010 | Jogand-Coulomb et al. |
| 2010/0117794 A1 | 5/2010 | Adams et al. |
| 2010/0134257 A1 | 6/2010 | Puleston et al. |
| 2010/0169442 A1 | 7/2010 | Liu et al. |
| 2010/0169964 A1 | 7/2010 | Liu et al. |
| 2010/0172567 A1 | 7/2010 | Prokoski |
| 2010/0174911 A1 | 7/2010 | Isshiki |
| 2010/0188226 A1 | 7/2010 | Seder et al. |
| 2010/0214100 A1 | 8/2010 | Page |
| 2010/0277283 A1 | 11/2010 | Burkart et al. |
| 2010/0277286 A1 | 11/2010 | Burkart et al. |
| 2010/0291896 A1 | 11/2010 | Corda |
| 2010/0305843 A1 | 12/2010 | Yan et al. |
| 2010/0328033 A1 | 12/2010 | Kamei |
| 2011/0072034 A1 | 3/2011 | Sly et al. |
| 2011/0072132 A1 | 3/2011 | Shafer et al. |
| 2011/0082735 A1 | 4/2011 | Kannan et al. |
| 2011/0085287 A1 | 4/2011 | Ebrom et al. |
| 2011/0091136 A1 | 4/2011 | Danch et al. |
| 2011/0116358 A9 | 5/2011 | Li et al. |
| 2011/0126188 A1 | 5/2011 | Bernstein et al. |
| 2011/0227740 A1 | 9/2011 | Wohltjen |
| 2011/0238517 A1 | 9/2011 | Ramalingam et al. |
| 2011/0246790 A1 | 10/2011 | Koh et al. |
| 2011/0266348 A1 | 11/2011 | Denniston, Jr. |
| 2011/0307599 A1 | 12/2011 | Saretto et al. |
| 2012/0028609 A1 | 2/2012 | Hruskajohn |
| 2012/0030006 A1 | 2/2012 | Yoder et al. |
| 2012/0069776 A1 | 3/2012 | Caldwell et al. |
| 2012/0086571 A1 | 4/2012 | Scalisi et al. |
| 2012/0182123 A1 | 7/2012 | Butler et al. |
| 2012/0212322 A1 | 8/2012 | Idsøe |
| 2012/0226451 A1 | 9/2012 | Bacot et al. |
| 2012/0226565 A1 | 9/2012 | Youriy |
| 2012/0226907 A1 | 9/2012 | Hohberger et al. |
| 2012/0238287 A1 | 9/2012 | Scherzer |
| 2012/0278188 A1 | 11/2012 | Attar et al. |
| 2012/0310720 A1 | 12/2012 | Balsan et al. |
| 2013/0019295 A1 | 1/2013 | Park et al. |
| 2013/0019323 A1 | 1/2013 | Arvidsson et al. |
| 2013/0044111 A1 | 2/2013 | VanGilder et al. |
| 2013/0111543 A1 | 5/2013 | Brown et al. |
| 2013/0135082 A1 | 5/2013 | Xian et al. |
| 2013/0179201 A1 | 7/2013 | Fuerstenberg et al. |
| 2013/0276140 A1 | 10/2013 | Coffing et al. |
| 2013/0331063 A1 | 12/2013 | Cormier et al. |
| 2014/0074696 A1 | 3/2014 | Glaser |
| 2014/0147018 A1 | 5/2014 | Argue et al. |
| 2014/0266604 A1 | 9/2014 | Masood et al. |
| 2014/0266713 A1 | 9/2014 | Sehgal et al. |
| 2015/0039451 A1 | 2/2015 | Paul |
| 2015/0294293 A1 | 10/2015 | Mikael |
| 2015/0310385 A1 | 10/2015 | King et al. |
| 2015/0310440 A1 | 10/2015 | Hynes et al. |
| 2016/0210614 A1 | 7/2016 | Hall |
| 2016/0300236 A1 | 10/2016 | Wiley et al. |
| 2017/0085564 A1 | 3/2017 | Giobbi et al. |
| 2017/0091548 A1 | 3/2017 | Agrawal et al. |
| 2018/0322718 A1 | 11/2018 | Qian et al. |
| 2018/0357475 A1 | 12/2018 | Honda et al. |
| 2019/0172281 A1 | 6/2019 | Einberg et al. |
| 2019/0260724 A1 | 8/2019 | Hefetz et al. |

FOREIGN PATENT DOCUMENTS

| | | |
|---|---|---|
| WO | 01/22724 | 3/2001 |
| WO | 01/35334 | 5/2001 |
| WO | 01/75876 | 10/2001 |
| WO | 01/77790 | 10/2001 |
| WO | 2004/010774 A1 | 2/2004 |
| WO | 2004/038563 | 5/2004 |
| WO | 2005/021663 A2 | 4/2005 |
| WO | 2005/050450 | 6/2005 |
| WO | 2005/086802 | 9/2005 |
| WO | 2007/087558 | 8/2007 |

OTHER PUBLICATIONS

Muller, "Desktop Encyclopedia of the Internet," 1999, Artech House Inc., Norwood, MA, all pages.

National Criminal Justice Reference Service, "Antenna Types," Dec. 11, 2006, online at http://ncjrs.gov/pdffiles/nij/185030b.pdf, retrieved from http://web.archive.org/web/*/http://www.ncjrs.gov/pdffiles1/nij/185030b.pdf on Jan. 12, 2011, 1 pg.

Nel et al., "Generation of Keys for use with the Digital Signature Standard (DSS)," Communications and Signal Processing, Proceedings of the 1993 IEEE South African Symposium, Aug. 6, 1993, pp. 6-11.

Nerd Vittles, "magicJack: Could It Be the Asterisk Killer?" Aug. 1, 2007, retrieved from http://nerdvittles.com/index.php?p=187 on or before Oct. 11, 2011, 2 pgs.

Nilsson et al., "Match-on-Card for Java Cards," Precise Biometrics, white paper, Apr. 2004, retrieved from www.ibia.org/membersadmin/whitepapers/pdf/17/Precise%20Match-on-Card%20for%20Java%20Cards.pdf on Jan. 7, 2007, 5 pgs.

Noore, "Highly Robust Biometric Smart Card Design." IEEE Transactions on Consumer Electronics, vol. 46, No. 4, Nov. 2000, pp. 1059-1063.

Nordin, "Match-on-Card Technology," Precise Biometrics, white paper, Apr. 2004, retrieved from www.ibia.org/membersadmin/whitepapers/pdf/17/Precise%20Match-on-Card%20technology.pdf on Jan. 7, 2007, 7 pgs.

Paget, "The Security Behind Secure Extranets," Enterprise Systems Journal, vol. 14, No. 12, Dec. 1999, 4 pgs.

Pash, "Automate proximity and location-based computer actions," Jun. 5, 2007, retrieved from http://lifehacker.com/265822/automate-proximity-and-location+based-computer-actions on or before Oct. 11, 2011, 3 pgs.

Pope et al., "Oasis Digital Signature Services: Digital Signing without the Headaches," IEEE Internet Computing, vol. 10, Sep./Oct. 2006, pp. 81-84.

SAFLInk Corporation, "SAFModule™: A Look Into Strong Authentication," white paper, retrieved from www.ibia.org/membersadmin/whitepapers/pdf/6/SAFmod_WP.pdf on Jan. 7, 2007, 8 pgs.

Sapsford, "E-Business: Sound Waves Could Help Ease Web-Fraud Woes," Wall Street Journal, Aug. 14, 2000, p. B1.

(56) References Cited

OTHER PUBLICATIONS

Singh et al. "A Constraint-Based Biometric Scheme on ATM and Swiping Machine." 2016 International Conference on Computational Techniques in Information and Communication Technologies (ICCTICT), Mar. 11, 2016, pp. 74-79.
Smart Card Alliance, "Contactless Technology for Secure Physical Access: Technology and Standards Choices," Smart Card Alliance, Oct. 2002, pp. 1-48.
Smart Card Alliance, "Alliance Activities: Publications: Identity: Identity Management Systems, Smart Cards and Privacy," 1997-2007, retrieved from www.smartcardalliance.org/pages/publications-identity on Jan. 7, 2007, 3 pgs.
SplashID, "SplashID—Secure Password Manager for PDAs and Smartphones," Mar. 8, 2007, retrieved from http://www.splashdata.com/splashid/ via http://www.archive.org/ on or before Oct. 11, 2011, 2 pgs.
Srivastava, "Is internet security a major issue with respect to the slow acceptance rate of digital signatures," Jan. 2, 2005, Computer Law & Security Report, pp. 392-404.
Thomson Multimedia, "Thomson multimedia unveils copy protection proposal designed to provide additional layer of digital content security," retrieved from www.thompson-multimedia.com/gb/06/c01/010530.htm on Mar. 4, 2002, May 30, 2001, 2 pgs.
UnixHelp, "What is a file?" Apr. 30, 1998, retrieved from unixhelp.ed.ac.uk/editors/whatisafile.html.accessed Mar. 11, 2010 via http://waybackmachine.org/19980615000000*/http://unixhelp.ed.ac.uk/editors/whatisafile.html on Mar. 11, 2011, 1 pg.
Vainio, "Bluetooth Security," Helsinki University of Technology, May 25, 2000, 17 pgs.
Van Winkle, "Bluetooth: The King of Connectivity," Laptop Buyer's Guide and Handbook, Jan. 2000, pp. 148-153.
Wade, "Using Fingerprints to Make Payments at POS Slowly Gaining Popularity," Credit Union Journal, International Biometric Group, Apr. 21, 2003, retrieved from http://www.biometricgroup.com/in_the_news/04.21.03.html on Jan. 7, 2007, 3 pgs.
Wallace, "The Internet Unplugged," InformationWeek, vol. 765, No. 22, Dec. 13, 1999, pp. 22-24.
Weber, "In the Age of Napster, Protecting Copyright is a Digital Arms Race," Wall Street Journal, Eastern ed., Jul. 24, 2000, p. B1.
White, "How Computers Work," Millennium Edition, 1999, Que Corporation, Indianapolis, IN, all pages.
Yoshida, "Content protection plan targets wireless home networks," EE Times, Jan. 11, 2002, retrieved from www.eetimes.com/story/OEG20020111S0060 on Mar. 4, 2002, 2 pgs.
IEEE Computer Society, "IEEE Std 802.15.4™—Part 15.4: Wireless Medium Access Control (MAC) and Physical Layer (PHY) Specifications for Low-Rate Wireless Personal Area Networks (LR-WPANs)," The Institute of Electrical and Electronics Engineers, Inc., New York, NY, Oct. 1, 2003, 679 pgs.
Smart Card Alliance, "Smart Cards and Biometrics White Paper: Smart Card Alliance," May 2002, retrieved from http://www.securitymanagement.com/library/smartcard_faqtech0802.pdf on Jan. 7, 2007, 7 pgs.
Anonymous, "Applying Biometrics to Door Access," Security Magazine, Sep. 26, 2002, retrieved from http://www.securitymagazine.com/CDA/Articles/Technologies/3ae610eaa34d8010VgnVCM100000f932a8c0____ on Jan. 7, 2007, 5 pgs.
Anonymous, "Firecrest Shows How Truly Commercially-Minded Companies Will Exploit the Internet," Computergram International, Jan. 18, 1996, 2 pgs.
Anonymous, "IEEE 802.15.4-2006—Wikipedia, the free encyclopedia," Wikipedia, last modified Mar. 21, 2009, retrieved from http://en.wikipedia.org/wiki/IEEE_802.15.4-2006 on Apr. 30, 2009, 5 pgs.
Antonoff, "Visiting Video Valley," Sound & Vision, Nov. 2001, pp. 116, 118-119.
Apple et al., "Smart Card Setup Guide," 2006, downloaded from http://manuals.info.apple.com/en_US/Smart_Card_Setup_Guide.pdf on or before May 3, 2012, 16 pgs.
Balanis, "Antenna Theory: A Review," Jan. 1992, Proceedings of the IEEE, vol. 80, No. 1, p. 13.
Beaufour, "Personal Servers as Digital Keys," Proceedings of the Second IEEE Annual Conference on Pervasive Computing and Communications (PERCOM'04), Mar. 14-17, 2004, pp. 319-328.
BioPay, LLC, "Frequently Asked Questions (FAQs) About BioPay," at least as early as Jan. 7, 2007, retrieved from http://www.biopay.com/faqs-lowes.asp on Jan. 7, 2007, 5 pgs.
BlueProximity, "BlueProximity—Leave it—it's locked, come back, it's back too . . . " Aug. 26, 2007, retrieved from http://blueproximity.sourceforge.net/ via http://www.archive.org/ on or before Oct. 11, 2011, 1 pg.
Bluetooth SIG, Inc. "Bluetooth," www.bluetoothcom, Jun. 1, 2000, 8 pgs.
Bluetooth SIG, Inc., "Say Hello to Bluetooth," retrieved from www.bluetooth.com, at least as early as Jan. 14, 2005, 4 pgs.
Blum, "Digital Rights Management May Solve the Napster 'Problem,'" Technology Investor, Oct. 2000, pp. 24-27.
Bohrsatom et al., "Automatically unlock PC when entering proximity," Dec. 7, 2005, retrieved from http://salling.com/forums/viewtopic.php?t=3190 on or before Oct. 11, 2011, 3 pgs.
Brown, "Techniques for Privacy and Authentication in Personal Communication Systems," Personal Communications, IEEE, Aug. 1995, vol. 2, No. 4, pp. 6-10.
Chen et al. "On Enhancing Biometric Authentication with Data Protection." KES2000. Fourth International Conference on Knowledge-Based Intelligent Engineering Systems and Allied Technologies. Proceedings (Cat. No. 00TH8516), vol. 1, Aug. 1, 2000, pp. 249-252.
Cisco Systems, Inc., "Antenna Patterns and Their Meaning," 1992-2007, p. 10.
Costa, "Imation USB 2.0 Micro Hard Drive," Nov. 22, 2005, retrieved from http://www.pcmag.com/article2/0,2817,1892209,00.asp on or before Oct. 11, 2011, 2 pgs.
Dagan, "Power over Ethernet (PoE) Midspan—The Smart Path to Providign Power for IP Telephony," Product Manager, Systems, Aug. 2005, Power Dsine Inc., 28 pgs.
Dai et al., "Toward Blockchain-Based Accounting and Assurance", 2017, Journal of Information Systems, vol. 31, No. 3, Fall 2017, pp. 5-21.
DeBow, "Credit/Debit Debuts in Midwest Smart Card Test," Computers in Banking, vol. 6, No. 11, Nov. 1989, pp. 10-13.
Dennis, "Digital Passports Need Not Infringe Civil Liberties," Newsbytes, NA, Dec. 2, 1999, 2 pgs.
Derfler, "How Networks Work," Bestseller Edition, 1996, Ziff-Davis Press, Emeryville, CA, all pages.
Farouk et al., "Authentication Mechanisms in Grid Computing Environment: Comparative Study," IEEE, Oct. 2012, p. 1-6.
Fasca, "S3, Via Formalize Agreement," Electronic News, The Circuit, 45(45, Nov. 8, 1999), p. 20.
Giobbi, Specification of U.S. Appl. No. 60/824,758, filed Sep. 6, 2006, all pages.
Govindan et al. "Real Time Security Management Using RFID, Biometric and Smart Messages." 2009 3rd International Conference on Anti-Counterfeiting, Security, and Identification in Communication, Aug. 20, 2009, pp. 282-285.
Gralla, "How the Internet Works," Millennium Edition, 1999, Que Corporation, Indianapolis, IN, all pages.
Hendron, "File Security, Keychains, Encryptioin, and More with Mac OS X (10.3+)" Apr. 4, 2005, downloaded from http://www.johnhendron.net/documents/OSX_Security.pdf on or before May 3, 2012, 30 pgs.
International Search Report and Written Opinion for International Application No. PCT/US04/38124, dated Apr. 7, 2005, 10 pgs.
International Search Report and Written Opinion for International Application No. PCT/US05/07535, dated Dec. 6, 2005, 6 pgs.
International Search Report and Written Opinion for International Application No. PCT/US05/43447, dated Feb. 22, 2007, 7 pgs.
International Search Report and Written Opinion for International Application No. PCT/US05/46843, dated Mar. 1, 2007, 10 pgs.
International Search Report and Written Opinion for International Application No. PCT/US07/00349, dated Mar. 19, 2008, 10 pgs.

(56) References Cited

OTHER PUBLICATIONS

International Search Report and Written Opinion for International Application No. PCT/US07/11102, dated Oct. 3, 2008, 11 pgs.
International Search Report and Written Opinion for International Application No. PCT/US07/11103, dated Apr. 23, 2008, 9 pgs.
International Search Report and Written Opinion for International Application No. PCT/US07/11104, dated Jun. 26, 2008, 9 pgs.
International Search Report and Written Opinion for International Application No. PCT/US07/11105, dated Oct. 20, 2008, 10 pgs.
International Search Report and Written Opinion for International Application No. PCT/US08/83060, dated Dec. 29, 2008, 9 pgs.
International Search Report and Written Opinion for International Application No. PCT/US08/87835, dated Feb. 11, 2009, 8 pgs.
International Search Report and Written Opinion for International Application No. PCT/US09/34095, dated Mar. 25, 2009, 11 pgs.
International Search Report and Written Opinion for International Application No. PCT/US2009/039943, dated Jun. 1, 2009, 9 pgs.
International Search Report and Written Opinion for International Application No. PCT/US2014/037609, dated Dec. 9, 2014, 13 pgs.
Jeyaprakash et al. "Secured Smart Card Using Palm Vein Biometric On-Card-Process." 2008 International Conference on Convergence and Hybrid Information Technology, 2008, pp. 548-551.
Katz et al., "Smart Cards and Biometrics in Privacy-Sensitive Secure Personal Identification System," May 2002, Smart Card Alliance, p. 1-29.
Kontzer, "Thomson Bets on Smart Cards for Video Encryption," InformationWeek, Jun. 7, 2001, retrieved from www.informationweek.com/story/IWK20010607S0013 on Mar. 4, 2002, 1 pg.
Lake, "Downloading for Dollars: Who said buying music off the Net would be easy?," Sound & Vision, Nov. 2000, pp. 137-138.
Lee et al., "Effects of dielectric superstrates on a two-layer electromagnetically coupled patch antenna," Antennas and Propagation Society International Symposium, Jun. 1989, AP-S. Digest, vol. 2, pp. 26-30, found at http://ieeexplore.ieee.org/stamp/stamp.jsp?tp=&arnumber=1347.
Lewis, "Sony and Visa in On-Line Entertainment Venture," New York Times, vol. 145, Thurs. Ed., Nov. 16, 1995, 1 pg.
Liu et al., "A Practical Guide to Biometric Security Technology, " IT Pro, vol. 3, No. 1, Jan./Feb. 2001, pp. 27-32.
McIver et al., "Identification and Verification Working Together," Bioscrypt, White Paper: Identification and Verification Working Together, Aug. 27, 2004, retrieved from www.ibia.org/membersadmin/whitepapers/pdf/15/Identification%20and%20Verification%20Working%20Together.pdf on Jan. 7, 2007, 5 pgs.

\* cited by examiner

SECURITY SYSTEM AND METHOD FOR CONTROLLING ACCESS TO COMPUTING RESOURCES

CROSS REFERENCE TO RELATED APPLICATIONS

The present application claims priority under 35 U.S.C. § 120 to U.S. patent application Ser. No. 14/973,565 entitled "Security System and Method for Controlling Access to Computing Resources," filed Dec. 17, 2015, claims priority under 35 U.S.C. § 120 to U.S. patent application Ser. No. 12/340,501 entitled "Security System and Method for Controlling Access to Computing Resources," filed Dec. 19, 2008, which claims the benefit of priority under 35 U.S.C. § 119(e) of U.S. Provisional Application No. 61/015,110 entitled "ProxAccess," filed on Dec. 19, 2007 by John J. Giobbi, the entire contents of which are incorporated by reference herein.

Applicants hereby notify the USPTO that the claims of the present application are different from those of the parent application and any other related applications. Therefore, Applicants rescind any disclaimer of claim scope made in the parent application or any other predecessor application in relation to the present application. The Examiner is therefore advised that any such disclaimer and the cited reference that it was made to avoid may need to be revisited at this time. Furthermore, the Examiner is also reminded that any disclaimer made in the present application should not be read into or against the parent application, the grandparent application or any other related application.

BACKGROUND OF THE INVENTION

Field of the Invention

The present invention relates to a system and method for controlling access to computing resources. More specifically, the present invention relates to a security system that requires the presence of a personal digital key (PDK) before secure computing resources can be accessed.

Description of the Related Art

The use and proliferation of personal computers and other similar computing systems have become widespread. In many cases, a user may have several computers with which she interacts. For example, the user may have a personal computer at their office, a laptop for personal use and a family computer. Additionally, the user may have a cell phone, a personal digital assistant, or other individualized computing devices. Increasingly, these computers store confidential and sensitive information such as contacts lists, financial information, business information and identification information. Most currently existing systems have only a minimal amount of security protection such as requiring a user to enter a password before their personal computer becomes operational.

These computer systems are often used to access third-party systems. These third-party systems often require a user identification name and a password before the user will be granted access. Each of the individual third-party systems often has different requirements both in terms of user name and in terms of password format. Moreover, as the world becomes increasingly digital, the owners of these third-party systems want to ensure security of their systems and include fraudulent use. Thus, the third parties often require that the users change their passwords after a predetermined period of time or a predetermined number of accesses to the system. Most users have several external systems, and many users have as many as a hundred of third-party systems that are accessed on a regular basis. Therefore, it is often difficult for users to remember the myriad of user name and password combinations that are required to access such third-party systems and.

Additionally, many of the third-party systems are providing highly confidential information that is received by the end stored on the user's individual computer systems. These data files often contain sensitive information such as bank account records, tax returns, credit card information, and investment information. Furthermore, other personal information is also stored on such computer systems. Such personal information can be used for identity theft in the event that information falls into the wrong hands. While there are file encryption systems and mechanisms in the prior art, these systems are often difficult to use because they require that the user specify which files are encrypted, provide a password, and such administrative overhead in securing sensitive information stored on the hard drive of a personal computer makes the use of such systems rare.

Thus there is a need for a system and method that secures computing systems automatically and in a nonintrusive way.

SUMMARY OF THE INVENTION

The present invention overcomes the deficiencies of the prior art with a security system and method for controlling access to computing resources. In one embodiment, the security system comprises a personal digital key (PDK), a reader and a computing device. The PDK is a portable, personal transceiver that includes a controller and one or more passwords or codes. The PDK is able to link and communicate with the reader via a wireless radio frequency (RF) signal. The reader is a device that is able to wirelessly communicate with the PDK and also provides a wired output signal line for sending data, applications and other information. The reader is coupled to the computing device. The computing device includes a detection engine, vault storage and a set up module. The detection engine detects events relating to the access any files and third-party systems by the computing device and receives information from the reader as to whether the PDK is present/linked. The detection engine controls whether a user is able to access any of the functionality provided by the computing device based upon whether the PDK is in communication with the reader or not. The PDK and/or the vault storage include encrypted information such as usernames, passwords and other information utilized by the computing device to grant access to components, files and third-party systems. The security system is particularly advantageous because the PDK, reader and computing device automatically cooperate as a security system to either allow or deny access to the functionality provided by the computing device. More specifically, the user need not do anything, while in the background the PDK, the reader and the computing device communicate and exchange information to enable or disable access to information and third-party systems using the computing device. The present invention also includes a number of methods such as a method for initializing the security system, a method for setting up a computing device, and a method for controlling access to computing resources.

The features and advantages described herein are not all-inclusive and many additional features and advantages will be apparent to one of ordinary skill in the art in view of the figures and description. Moreover, it should be noted that the language used in the specification has been principally selected for readability and instructional purposes, and not to limit the scope of the inventive subject matter.

BRIEF DESCRIPTION OF THE DRAWINGS

The invention is illustrated by way of example, and not by way of limitation in the figures of the accompanying drawings in which like reference numerals are used to refer to similar elements.

DETAILED DESCRIPTION OF PREFERRED EMBODIMENTS

Figure 1:
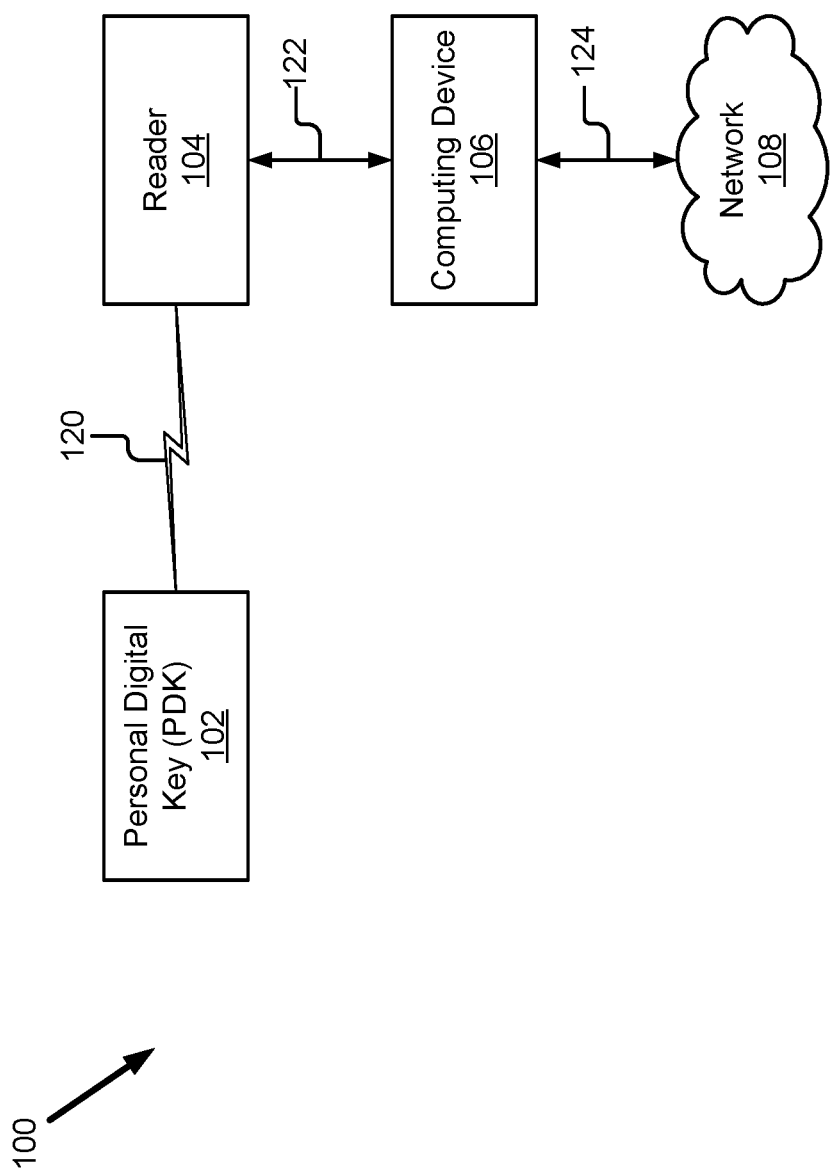
FIG. 1 is a block diagram of a first embodiment of a security system in a first state in accordance with the present invention.

A security system and method for controlling access to computing resources is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention. For example, the present invention is described in one embodiment below with reference to a controlling access to a personal computer. However, those skilled in the art will recognize that the present invention applies to access to any other device that may include a computer or is computer controlled.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment. In particular the present invention is described below in the context of two distinct architectures and some of the components are operable in both architectures while others are not.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Finally, the algorithms and displays presented herein are not inherently related to any particular computer or other apparatus. Various general-purpose systems may be used with programs in accordance with the teachings herein, or it may prove convenient to construct more specialized apparatuses to perform the required method steps. The required structure for a variety of these systems will appear from the description below. In addition, the present invention is described without reference to any particular programming language. It will be appreciated that a variety of programming languages may be used to implement the teachings of the invention as described herein.

FIG. 1 shows an embodiment of a security system 100 for controlling access to computing resources in accordance with the present invention. The security system 100 comprises a personal digital key (PDK) 102, a reader 104 and a computing device 106. As shown in FIG. 1, the computing device 106 is also coupled by signal line 124 to a network 108.

More particularly, FIG. 1 shows the security system 100 in a first state in which the PDK 102 is linked and in communication with the reader 104.

The PDK 102 is a portable, personal key that wirelessly communicates (e.g., using radio frequency (RF) signals) with the reader 104. The PDK 102 includes an area for storing security information including sign-on records, a set up information, user names, passwords, etc. The PDK 102 is will be described below in more detail with reference to FIG. 5. The PDK 102 also includes logic for initiating and maintaining contact with the reader 104 when it is within range. FIG. 1 illustrates an example where the PDK 102 is within range of the reader 104 and a link 120 has been established between them.

The reader 104 is a device that is able to wirelessly communicate with the PDK 102 and also provides signals on line 122 for sending data, applications and other information to the computing device 106. One of the major functions of the reader 104 is to detect PDKs 102 within communication range and establish links to them. The reader 104 primarily acts as an intermediary to pass information about the PDK 102 to the computing device 106. The reader 104 automatically signals the computing device 106 when it is linked to the PDK 102 and when the link 120 is severed. The reader 104 also includes an area for storage of applications and set up information that can be provided to the computing device 106 during initialization. The reader 104 will be described in more detail below with reference to FIG. 6.

The computing device 106 may be any conventional device such as but not limited to a personal computer, a laptop computer, a smart phone, a personal digital assistant, etc. The computing device 106 also includes a detection engine 760, vault storage 762 and a set up module 764 (see FIG. 7). The detection engine 760 detects events relating to the access any components, files or third-party systems by the computing device 106. The detection engine 760 also receives information from the reader 104 as to whether the PDK is present or linked. The detection engine 760 controls whether a user is able to access any of the functionality provided by the computing device 106 based upon whether the PDK is in communication with the reader or not. One embodiment for the computing device 106 is described in more detail below with reference to FIG. 7.

The PDK 102 and/or the vault storage 762 includes encrypted information such as usernames, passwords, and other information utilized by the computing device 106 to grant access to components, files and third-party systems. The present invention is particularly advantageous because the PDK 102, reader 104 and computing device 106 automatically cooperate as a security system 100 to either allow or deny access to the functionality provided by the computing device 106. More specifically, the user need not do anything but carry the PDK 102 on his or her person, and in the background the PDK 102, reader 104 and computing device 106 communicate and exchange information to enable or disable access to information and third-party systems using the computing device.

Figure 2:
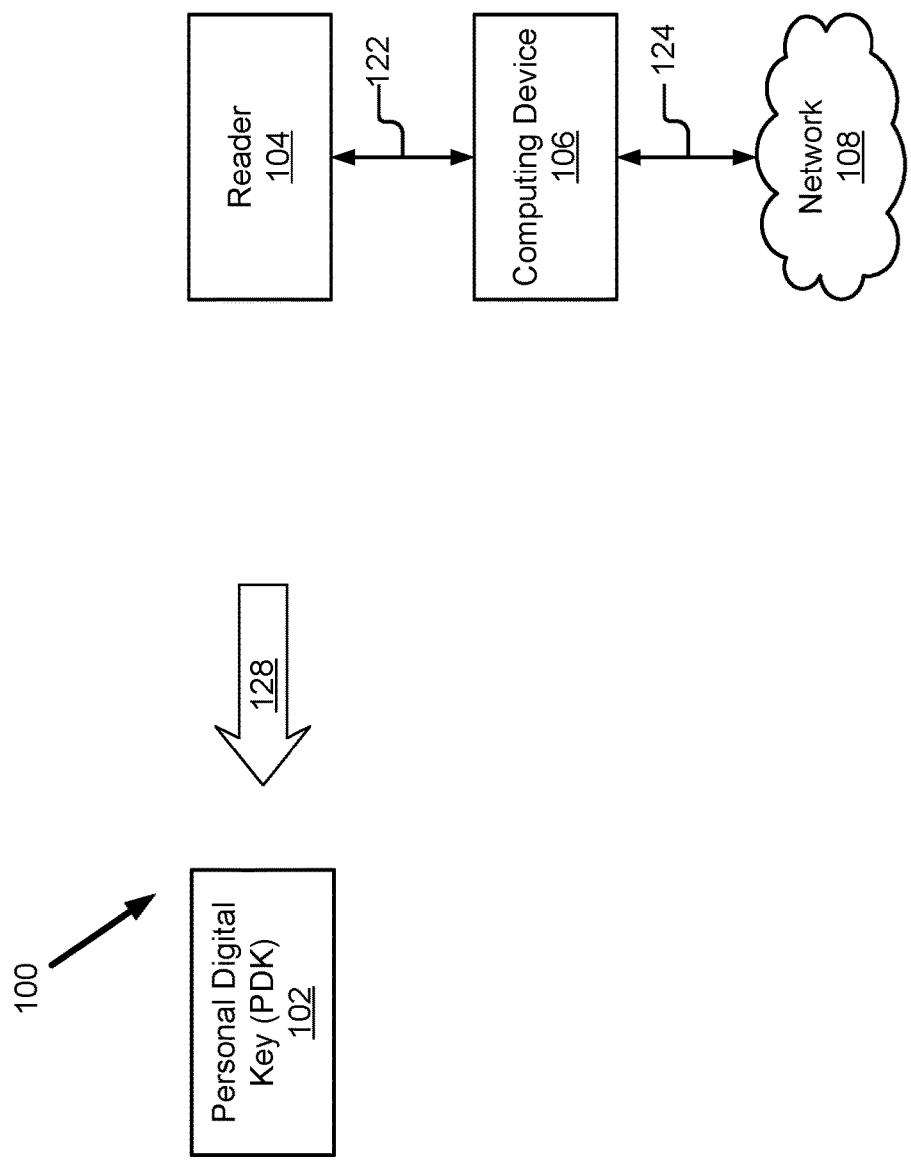
FIG. 2 is a block diagram of the first embodiment of the security system in a second state in accordance with the present invention.

Referring now FIG. 2, the same embodiment of the security system 100 described above with reference to FIG. 1 is shown. However, FIG. 2 depicts a situation in which the PDK 102 has moved outside of communication range with the reader 104 as indicated by arrow 128. Specifically, FIG. 2 shows a second state in which the PDK 102 is no longer in communication and linked with the reader 104. Thus, in comparison to FIG. 1, there is no longer the link 120 between the PDK 102 and the reader 104. As will be described in more detail below, when the PDK 102 and the reader 104 are within communication range of each other, they automatically establish the link 120. Similarly, when they are outside of the communication range of each other, the link 120 is automatically severed. Whether the PDK 102 and the reader 104 are in the first state (link) or the second state (no link) is automatically communicated by the reader 104 to the computing device 106 and serves as a control signal to determine whether the functionality provided by the computing device 106 is enabled. More specifically, once the PDK 102 is in the state as shown in FIG. 2, the computing device 106 is disabled and does not allow the user to use any of the components, files or third-party systems that are typically accessed were part of the computing device 106.

Figure 3:
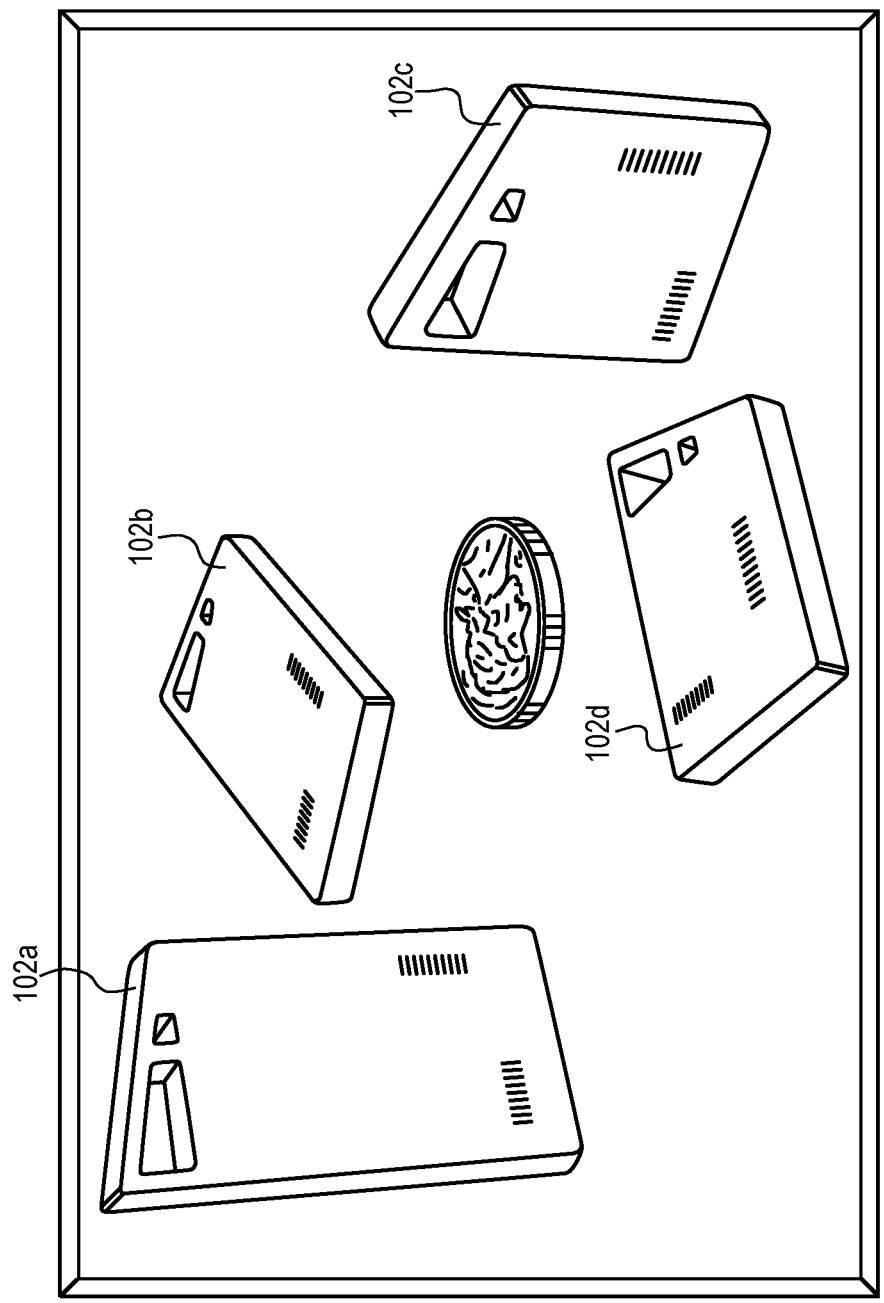
FIG. 3 is a perspective view of a plurality of personal digital keys (PDK) in accordance with one embodiment of the present invention.

Referring now to FIG. 3, a plurality of PDKs 102a-102b in accordance with one embodiment of the present invention is shown. As can be seen, the PDKs 102 a-102b are very small in size being less that 1"×0.5"×0.25". Thus, the PDK 102 is small enough to be attached to a user's key chain or placed in their pocket. In other embodiments, the PDK 102 is integrated as part of a cellular telephone or other portable electronic devices. Furthermore, the PDK 102 is particularly advantageous because it is able to communicate with them and establish the link 120 with corresponding reader 104 even when positioned inside a user's pocket, within clothing or inside a purse or case. Even when obscured from direct view or line of sight, the PDK 102 can establish the link 120 as long as it is positioned within five or less meters of the reader 104. However, those skilled in the art will realize that the effective communication range between the reader 104 and PDKs 102 is completely scalable and can be distances greater than five meters for other environments and conditions when greater distances are needed. In contrast to the prior art that requires that he be placed within 10 or less inches of the reader, the PDK 102 also does not need to be placed in very close proximity to the reader 104. Therefore, the security system 100 is particularly advantageous because the PDKs 102 provide a portable, automatic, continuous, effortless way for users to provide security, automatic sign-on and protection, device protection or file protection. The users do not need to remember another username and password or be concerned about its loss. Once the PDK 102 is out of range of the reader 104, the computing device 106 and the computing resources are provided are secure.

Figure 4:
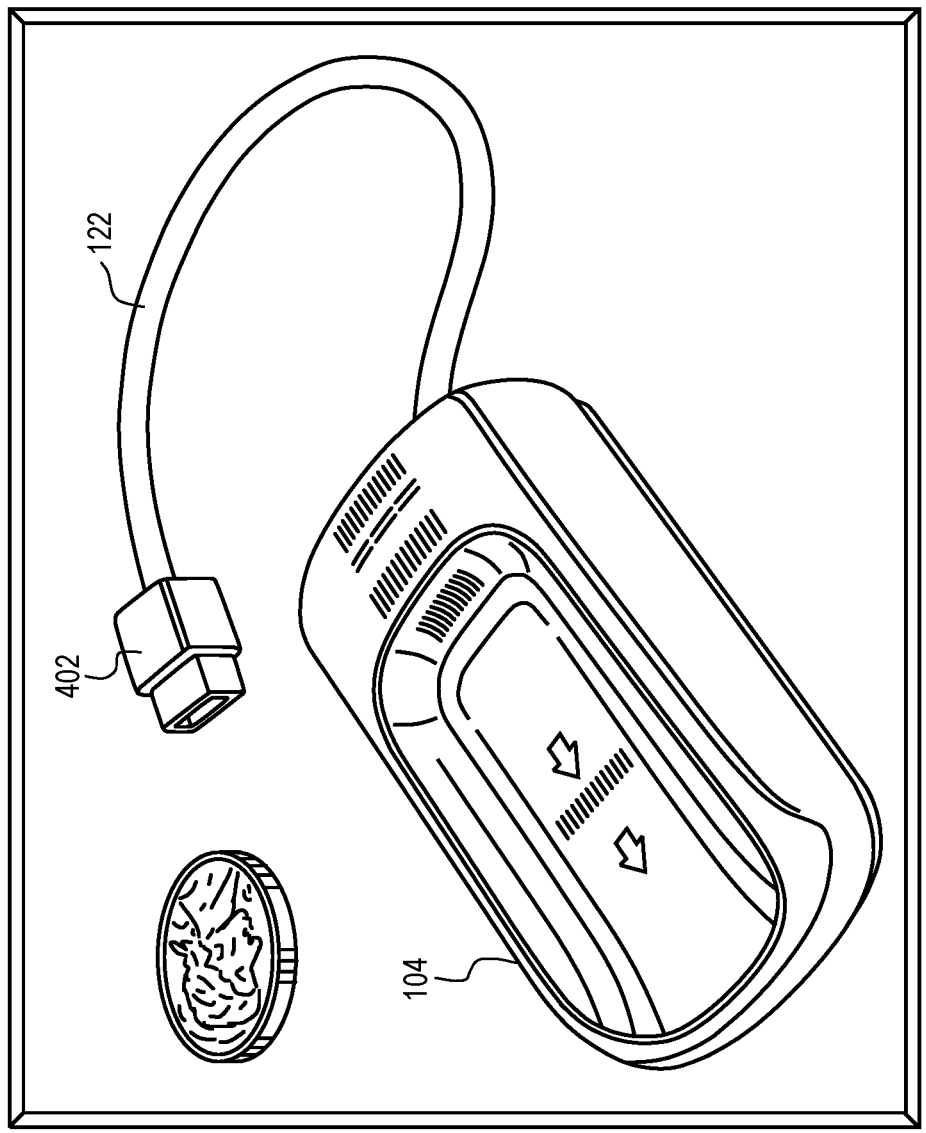
FIG. 4 is a perspective view of a reader in accordance with one embodiment of the present invention.

Referring now to FIG. 4, a perspective view of the reader 104 in accordance with one embodiment of the present invention is shown. In this embodiment, the reader 104 is also small in size being about 2 to 3 times the size of the PDK 102. The reader 104 also includes an area adapted to receive a PDK 102 in the event the user wants to place the PDK 102 directly on top of the reader 104. The PDK 102 is coupled to signal line 122 in the form of a cable. At a remote end of the cable it is, it is attached to a USB connector 402. Using the USB connector 402, the reader 104 may be directly coupled to the computing device 106. Those skilled in the art will recognize that in other embodiments, the reader 104 is built into a laptop computer or a personal computer similar to other input/output devices like finger print readers and bar code readers.

Figure 5:
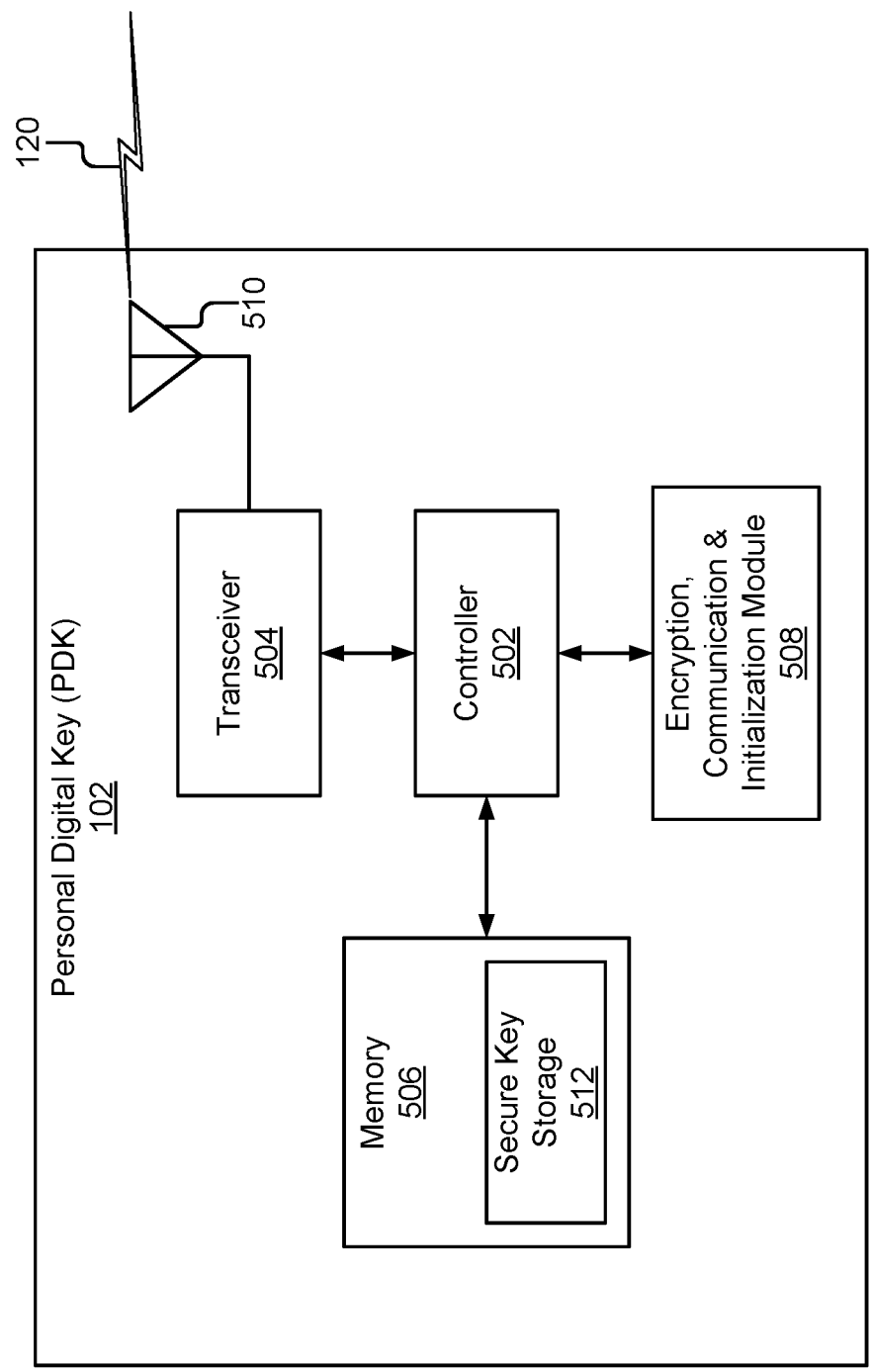
FIG. 5 is a block diagram of an embodiment of the PDK in accordance with the present invention.

Referring now to FIG. 5, an embodiment of the PDK 102 in accordance with the present invention is described. The PDK 102 comprises a controller 502, a transceiver 504, a memory 506 having a secure key storage 512, an encryption, communication and initialization module 508 and an antenna 510. The controller 502 is coupled to the transceiver 504, the memory 506 and the encryption, communication and initialization module 508. The controller 502 cooperates with the transceiver 504 to send and receive data and control signals to and from the PDK 102. The controller 502 cooperates with the memory 506 to store and retrieve information from the memory 506. In particular, the memory 506 includes the secure key storage 512. The secure key storage 512 can be used to store sign-on records and other set up data. The secure key storage area 512 is also used to store and encrypted user names and passwords. The transceiver 504 is coupled to the antenna 510 and the controller 502. The transceiver 504 receives and sends information to and from the controller 502 and also generates and receives radio frequency signals. In one embodiment the operation of the PDK 102 is dictated by the encryption, communication and initialization module 508 that is coupled to and controls the operation of the controller 502. The encryption, communication and initialization module 508 controls the initialization of the PDK 102 such as assigning it a unique ID. The encryption, communication and initialization module 508 also controls the communication of the PDK 102 with the reader 104 such as initializing and establishing the link 120, maintaining the link 120, and searching for readers 104 within range. The encryption, communication and initialization module 508 also controls the interaction of the PDK 102 with the reader 104 in terms of responding to requests for information and encrypted and storing information received from the reader 104. The encryption, communication and initialization module 508 also includes controls the encryption and decryption of data stored in and retrieved from the memory 506, in particular the secure key storage 512.

Additional details about other embodiments of the PDK 102 are shown and described in U.S. patent application Ser. No. 12/292,330, filed a Nov. 30, 2005 entitled "Personal Digital Key And Receiver/Decoder Circuit System And Method;" U.S. patent application Ser. No. 11/620,581, filed Jan. 5, 2007 entitled "Wireless Network Synchronization Of Cells And Client Devices On A Network;" U.S. patent application Ser. No. 11/744,831, filed May 5, 2007, entitled "Two-Level Authentication For Secure Transactions;" and U.S. patent application Ser. No. 11/744,832, filed May 5, 2007, entitled "Personal Digital Key Initialization And Registration For Secure Transactions;" the contents of which are incorporated by reference herein in their entirety.

Figure 6:
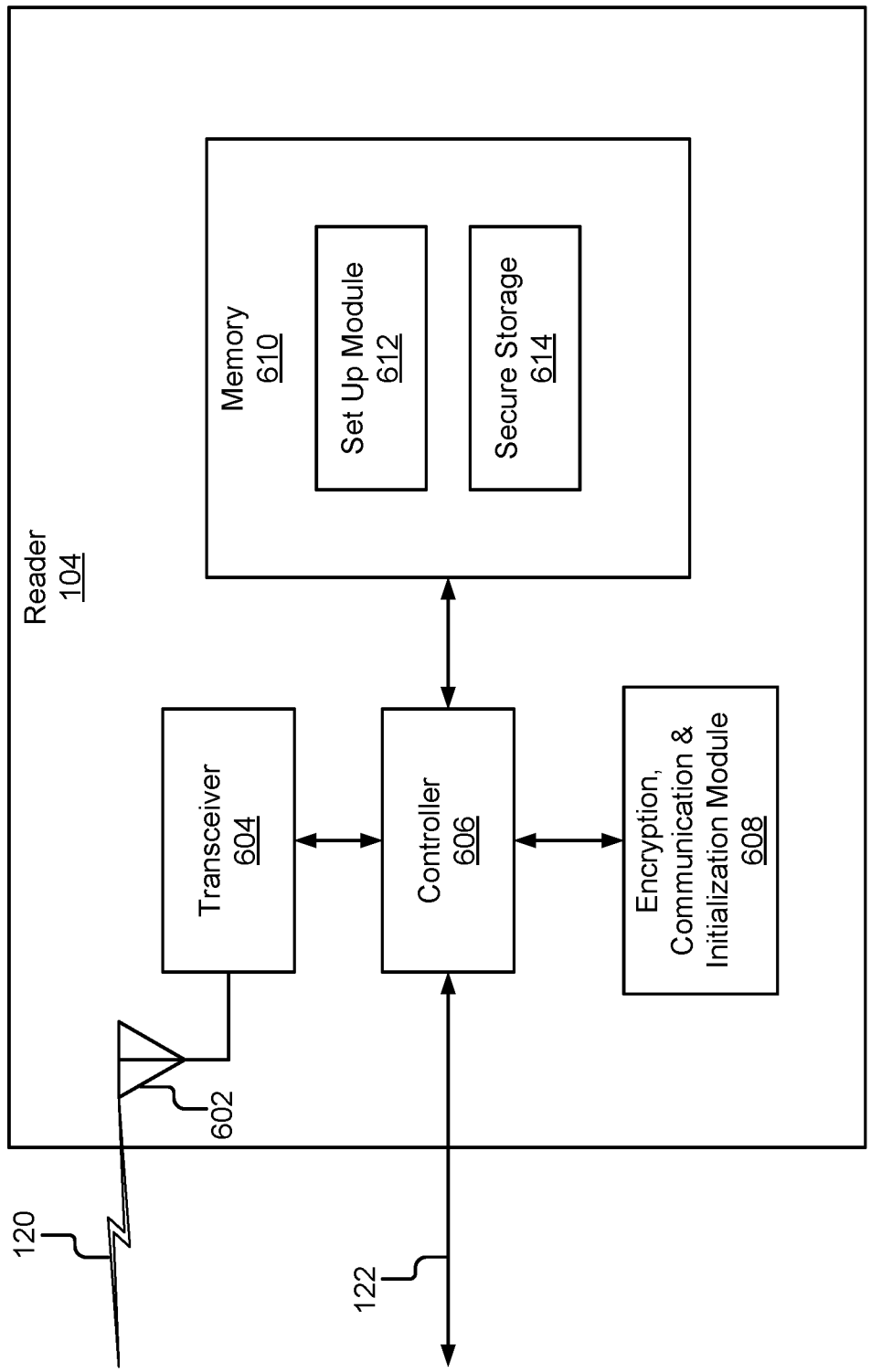
FIG. 6 is a block diagram of an embodiment of the reader in accordance with the present invention.

FIG. 6 is a block diagram of an embodiment of the reader 104 in accordance with the present invention. The reader 104 comprises an antenna 602, a transceiver 604, a controller 606, an encryption, communication and initialization module 608 and a memory 610. The memory 610 further comprises a setup module 612 and secure storage 614. The antenna 602 is coupled to the transceiver 604 and enables wireless communication between the reader 104 and the PDK 102. Even though only a single PDK 102 shown in FIGS. 1 and 2, it should be understood that the reader 104 communicates with and establish a link 120 with a plurality of PDKs 102. The transceiver 604 is coupled to the controller 606 to provide data received from the PDK 102 and to send data to the PDK 102. The controller 606 is coupled to and controlled by the encryption, authentication and initialization module 608. The encryption, authentication and initialization module 608 provides functionality similar to that described above with reference to FIG. 5, but for the reader 104. For example, the controller 606 under the direction and control of the encryption, authentication and initialization module 608: encrypts and decrypts information for storage in and retrieval from the memory 610, respectively; initializes the reader 104 such as recording setup information in the setup module 612 of the memory 610; and controls the communication with the PDK 102 via link 120 and the communication with the computing device 106 via signal line 122. As noted above, the memory 610 includes a setup module 612 and secure storage 614. The reader 104 includes two types of set up information that are stored in the setup module 612. First, set up information that is utilized for the reader 104 itself is stored in the setup module 612. Second, set up information that is sent to and loaded into the computing device 106 to initialize the computing device 106 is also stored in the setup module 612. In another embodiment, the setup module 612 also includes any other applications needed, and these applications can be loaded from the setup module 612 into the computing device 106. Under the direction of the encryption, communication and initialization module 608 the controller 606 retrieves this information from the setup module 612 and loads it into the computing device 106. The reader 104 also includes secure storage 614 for use when critical confidential data is passed from the PDK 102 through the reader 104 to the computing device 106. The secure storage 614 is used in conjunction with the encryption functionality provided by module 608 to store unencrypted data. The secure storage 614 is also used to store back-up passwords used to allow access to the computing device 106 when the PDK 102 is not in range.

Additional details about other embodiments of the reader or RDC 104 are shown and described in U.S. patent application Ser. No. 12/292,330, filed a Nov. 30, 2005 entitled "Personal Digital Key And Receiver/Decoder Circuit System And Method;" U.S. patent application Ser. No. 11/620,581, filed Jan. 5, 2007 entitled "Wireless Network Synchronization Of Cells And Client Devices On A Network;" U.S. patent application Ser. No. 11/744,831, filed May 5, 2007, entitled "Two-Level Authentication For Secure Transactions;" and U.S. patent application Ser. No. 11/744,832, filed May 5, 2007, entitled "Personal Digital Key Initialization And Registration For Secure Transactions;" the contents of which are incorporated by reference herein in their entirety.

Figure 7:
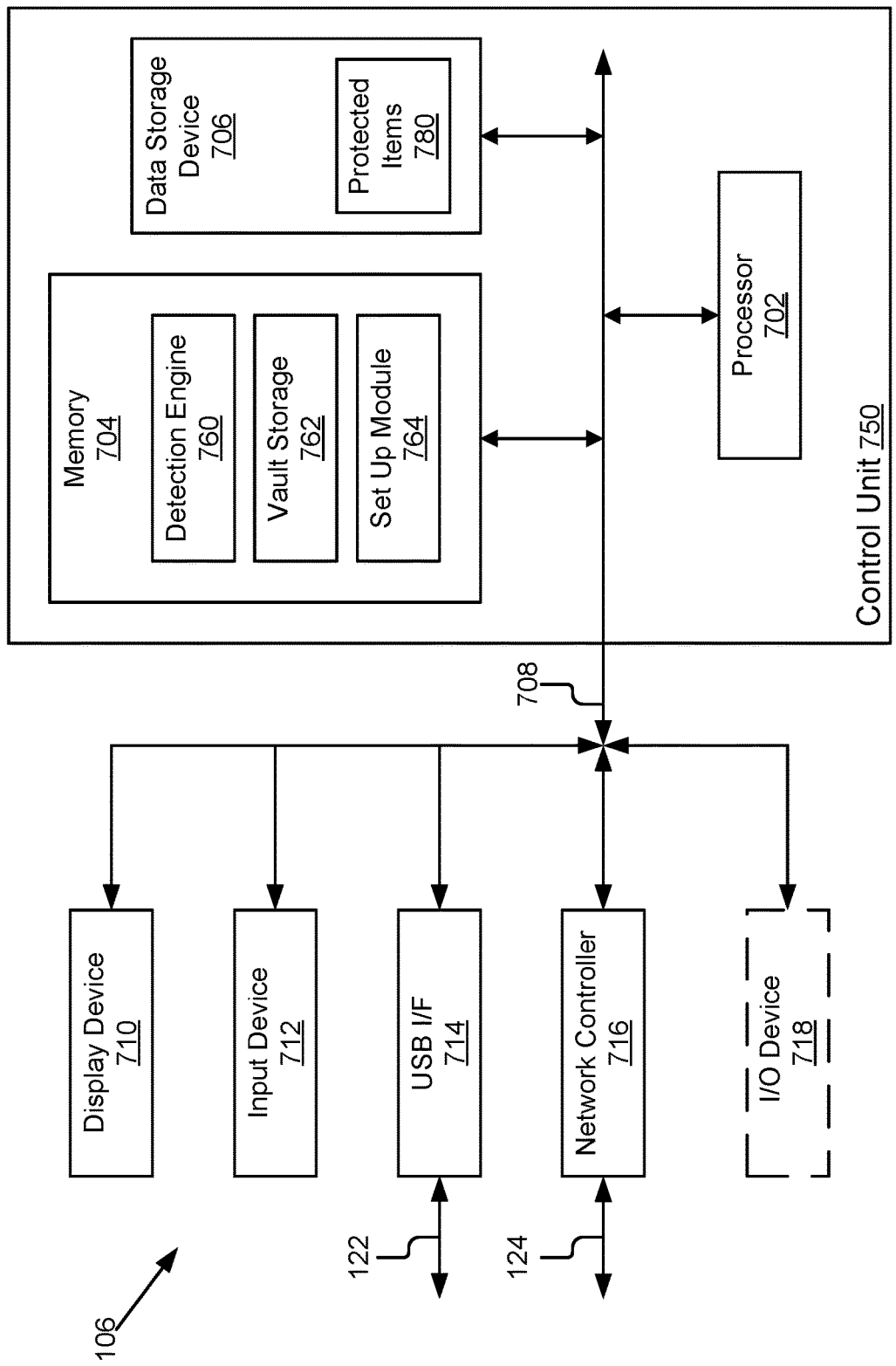
FIG. 7 is a block diagram of an embodiment of the computing device in accordance with the present invention.

Referring now also to FIG. 7, a functional block diagram of the computing device 106 configured in accordance with an embodiment of the present invention is shown. The computing device 106 comprises a control unit 750, a display device 710, an input device 712 and a Universal Serial Bus (USB) interface 714. The computing device 106 may optionally include a network controller 716 and one or more input/output (I/O) devices 718. Those skilled in the art will recognize that FIG. 7 nearly depicts one embodiment of the computing device 106 in which it is a personal computer, and that their variety of other embodiments where the computing device 106 has a different configuration. Nonetheless, in most of these other configurations some or all of the components described below with reference to FIG. 7 have a similar or equivalent functionality in the other embodiments of the computing device 106.

The control unit 750 comprises an arithmetic logic unit, a microprocessor, a general purpose computer or some other information appliance equipped to provide electronic display signals to display device 710. In one embodiment, the control unit 750 comprises a general purpose computer having a graphical user interface, which may be generated by, for example, a program written in Java running on top of an operating system like WINDOWS® or UNIX® based operating systems. In one embodiment, one or more application programs are executed by control unit 750 including, without limitation, drawing applications, word processing applications, electronic mail applications, financial applications and web browser applications.

Still referring to FIG. 7, the control unit 750 is shown as including processor 702, memory 704 and data storage device 706, all of which are communicatively coupled to system bus 708.

Processor 702 processes data signals and may comprise various computing architectures including a complex instruction set computer (CISC) architecture, a reduced instruction set computer (RISC) architecture, or an architecture implementing a combination of instruction sets. Although only a single processor is shown in FIG. 7, multiple processors may be included.

Memory 704 stores instructions and/or data that may be executed by processor 702. The instructions and/or data may comprise code for performing any and/or all of the techniques described herein. Memory 704 may be a dynamic random access memory (DRAM) device, a static random access memory (SRAM) device, some other memory device known in the art or any combinations of the preceding. In one embodiment, the memory 704 also includes an operating system such as one of a conventional type such as, WINDOWS®, SOLARIS® or LINUX® based operating systems. Although not shown, the memory unit 704 may also include one or more application programs including, without limitation, drawing applications, word processing applications, electronic mail applications, financial applications and web browser applications. Those skilled in the art will recognized that while the present invention will now be described as modules or portions of a memory unit 704 of a computer system 100, the modules or portions thereof may also be stored in other media such as permanent data storage device 706 and may be distributed across a network 104 having a plurality of different computers such as in a client/server environment. The memory 704 is shown as including a detection engine 760, vault storage 762 and a set up module 764. These modules 760, 762, 764 are coupled by bus 708 to the processor 702 for communication and cooperation to system 100.

The detection engine 760 is instructions and/or data that may be executed by processor 702. The instructions and/or data comprise code for performing any and/or all of the techniques described herein. More specifically, the detection engine 760 detects when a protected item is accessed, performs the process steps as specified by a set up record and also controls the processor 702 to perform encryption and decryption as necessary. The operation of the detection engine 760 is described in more detail below with reference to FIG. 11 A-11D. The detection engine 760 is coupled to control the processor 702. The detection engine 760 is also coupled to the protected items 780 and/or the processor 702 to determine when the protected items 780 are accessed. For example, the detection engine 760 is coupled to either the processor 702 or this data storage device 706 to determine when the protected items 780 are accessed.

The vault storage 762 is a portion of memory 704 used to store information utilized by the detection engine 760 to control operation of the security system 100 of the present invention. In one embodiment, the vault storage 762 is encrypted so that its contents cannot be accessed and utilized by other devices or programs or decoded for circumvention. In another embodiment, the vault storage 762 is locked or controlled in a manner such that only the detection engine 760 may access and use the information stored in the vault storage 762. The vault storage 762 stores security set up data for the secure items on the computing device 106. For example, this security set up data includes a plurality of item set up records, where each item set up record corresponds to a protected item 780. It should be understood that the vault storage 762 includes one vault file per computing device 106/PDK 102 pair. The PDK 102 of the computing device 106/PDK 102 pair is preferably a master PDK. In another embodiment, the vault file also includes information about other proxy PDKs related to the master PDK and a backup password. The set up records stored in the vault file corresponding to each of the protected items 780 and specify the process that must be undertaken in order to grant access to the particular protected item 780. In a second embodiment, the vault storage 762 includes a plurality the sub-vaults, optionally implemented utilizing a directory/subdirectory where each "secured type" is maintained in its own file. An extension of this concept includes maintaining complete subdirectories (within the primary Vault directory) for each "secured type" (in place of individual files for each). In a third embodiment, the vault storage 762 is maintained as a group of individual files (within a primary Vault directory), and the processor 702 gathers analytics data such a key use, access privileges, usage stats, etc, for each. In a fourth embodiment, the vault storage 762 is located on the PDK 102 as opposed to the computing device 106. This option enables additional methods for managing secured files as they are moved, copied, and transferred. As with the vault storage 762 located on computing device 106, a "backup" password may also be utilized to unlock access to the vault storage 762 in situations where biometric authentication options are unavailable. In a fifth embodiment, the vault storage 762 is utilize an "assigned ID", stored in & read from the PDK 102, in addition to, or in place of, a PDK's ID. This option enables another method for allowing multiple PDKs to access secured types as a "group". Example uses include enabling groups of PDKs/users to access files, storage devices, and even applications.

The set up module 764 is instructions and/or data that may be executed by processor 702 for initializing and setting up the computing device 106. The operation of the set up module 764 is described in more detail below with reference to FIGS. 8 and 9. The set up module 764 cooperates with the set up module 612 of the reader 104. In particular, the set up module 764 accesses the reader 104 to retrieve set up module 612 and copy that information into the memory 104 of the computing device 106. The set up module 612 is then executed by the processor 702 to generate the item setup records and store them in the vault storage 762. The set up module 612 also retrieves additional applications stored at the reader 104 and install and upload them on the memory of the computing device 106.

Data storage device 706 stores data and instructions for processor 702 and comprises one or more devices including a hard disk drive, a floppy disk drive, a CD-ROM device, a DVD-ROM device, a DVD-RAM device, a DVD-RW device, a flash memory device, or some other mass storage device known in the art. In one embodiment, the data storage device 706 also stores protected items 780. For example, the protected items 780 include storage devices such as data storage device 706, directories and files such as for data on the data storage device 706 and sign-on screens such as generated in a web browser. If a storage device is a protected item 780 that means that all data on the storage device is encrypted and access to it is protected. If directories or files are protected items 780, that means that the directory or file is encrypted and access is protected. If a sign-on screen is a protected item 780, any time that sign-on screen is displayed, the detection engine 760 detects its display and retrieves information necessary to complete the sign-on screen from a corresponding item set up record in the vault storage 762 and processes as needed. In other embodiments, protected items 780 includes information used in e-commerce, electronic signatures, digital signatures, licensee key management information for digital rights management.

System bus 708 represents a shared bus for communicating information and data throughout control unit 750. System bus 708 may represent one or more buses including an industry standard architecture (ISA) bus, a peripheral component interconnect (PCI) bus, a universal serial bus (USB), or some other bus known in the art to provide similar functionality. Additional components coupled to control unit 750 through system bus 708 include the display device 710, the input device 712, the USB interface 714, the network controller 716 and the I/O device(s) 718.

The display device 710 represents any device equipped to display electronic images and data as described herein. In one embodiment, the display device 710 is a liquid crystal display (LCD) and light emitting diodes (LEDs) similar to those on many personal computers to provide status feedback, operation settings and other information to the user. In other embodiments, the display device 710 may be, for example, a cathode ray tube (CRT) or any other similarly equipped display device, screen or monitor. In one embodiment, the display device 710 is equipped with a touch screen and/or includes a digitizer in which a touch-sensitive, transparent panel covers the screen of display device 710.

In one embodiment, the input device 712 is a series of buttons coupled to control unit 750 to communicate information and command selections to processor 702. The buttons are similar to those on any conventional computer. In another embodiment, the input device 712 includes a keyboard. The keyboard can be a QWERTY keyboard, a key pad, or representations of such created on a touch screen. In yet another embodiment, the input device 712 includes cursor control. Cursor control represents a user input device equipped to communicate positional data as well as command selections to processor 702. Cursor control 712 may include a mouse, a trackball, a stylus, a pen, a touch screen, cursor direction keys or other mechanisms to cause movement of a cursor.

The USB interface 714 is of a conventional type and is coupled to bus 708 for communication with the processor 702.

The network controller 716 links control unit 750 to a network 108 via signal line 124. The network may comprise a local area network (LAN), a wide area network (WAN) (e.g., the Internet), and/or any other interconnected data path across which multiple devices may communicate. The control unit 750 also has other conventional connections to other systems such as a network for distribution of files (media objects) using standard network protocols such as TCP/IP, http, https, and SMTP as will be understood to those skilled in the art.

As denoted by dashed lines, the computing device 106 may optionally include one or more input/output (I/O) devices 718 such as described below. One or more I/O devices 718 are coupled to the bus 708. These I/O devices may be part of computing device 106 in one embodiment and in another embodiment may be part of the other systems (not shown). For example, the I/O device 718 can include an image scanner for capturing an image of a document. The I/O device 718 may also includes a printer for generating documents. The I/O device 718 may also include audio input/output device equipped to receive audio input via a microphone and transmit audio output via speakers. In one embodiment, audio device is a general purpose; audio add-in/expansion card designed for use within a general purpose computer system. Optionally, I/O audio device may include one or more analog-to-digital or digital-to-analog converters, and/or one or more digital signal processors to facilitate audio processing.

It should be apparent to one skilled in the art that system 100 may include more or less components than those shown in FIG. 7 without departing from the spirit and scope of the present invention. For example, security system 100 may include additional memory, such as, for example, a first or second level cache, or one or more application specific integrated circuits (ASICs). Similarly, additional components input/output devices 718 may be coupled to control unit 750 including, for example, an RFID tag reader, digital still or video cameras, or other devices that may or may not be equipped to capture and/or download electronic data to control unit 750. One or more components could also be eliminated such as the keyboard & cursor control 712.

Figure 8:
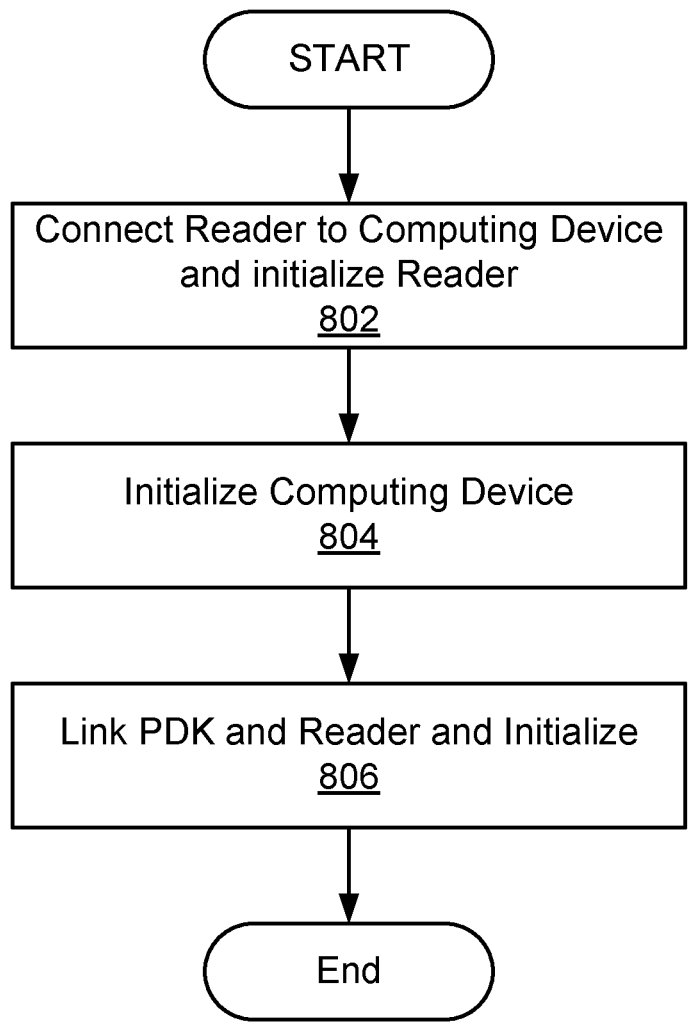
FIG. 8 is flowchart of a first embodiment of a method for initializing the security system in accordance with the present invention.
Figure 10:
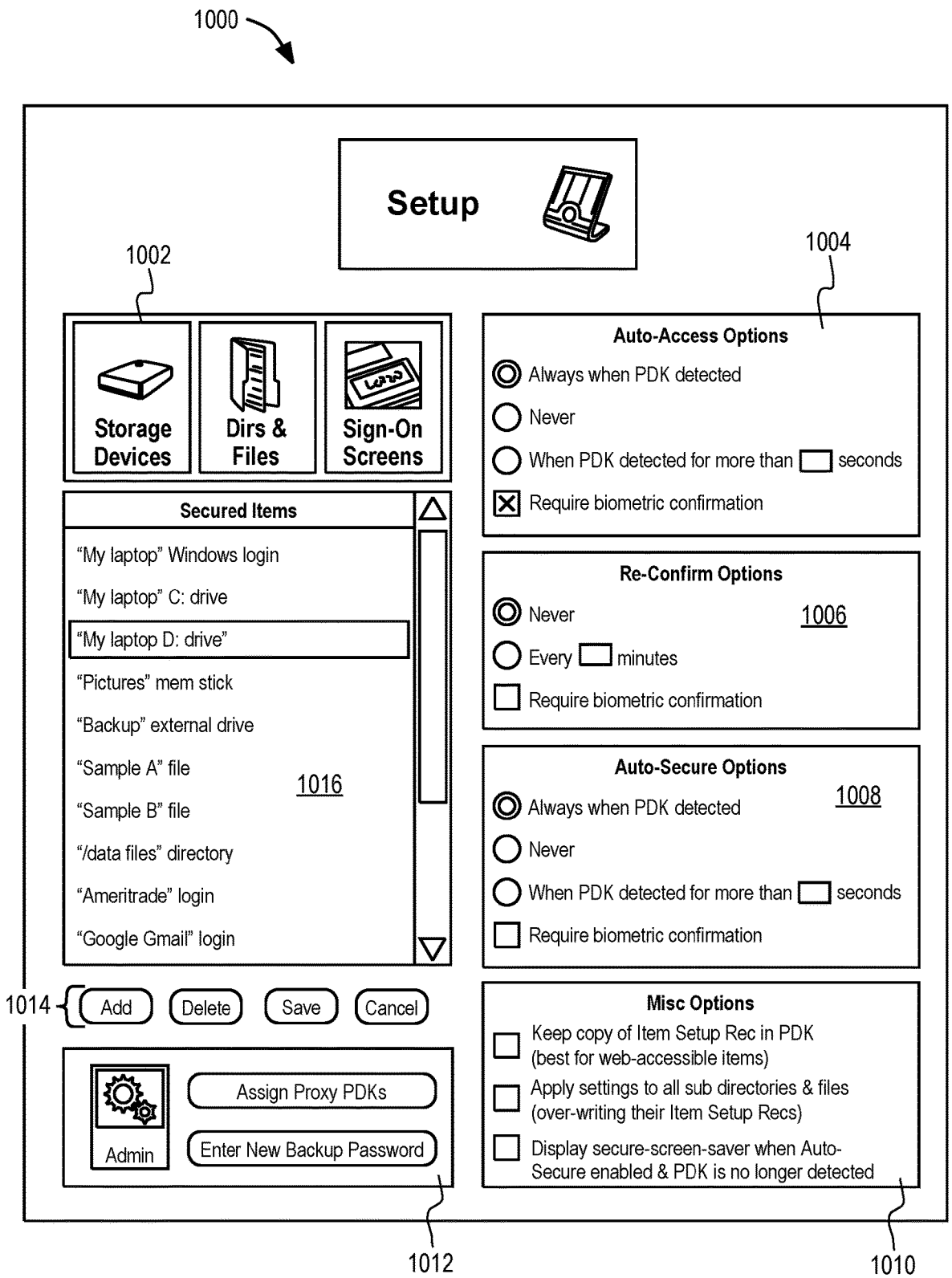
FIG. 10 is graphic representation of a set up user interface in accordance with one embodiment of the present invention.
Figure 11A:
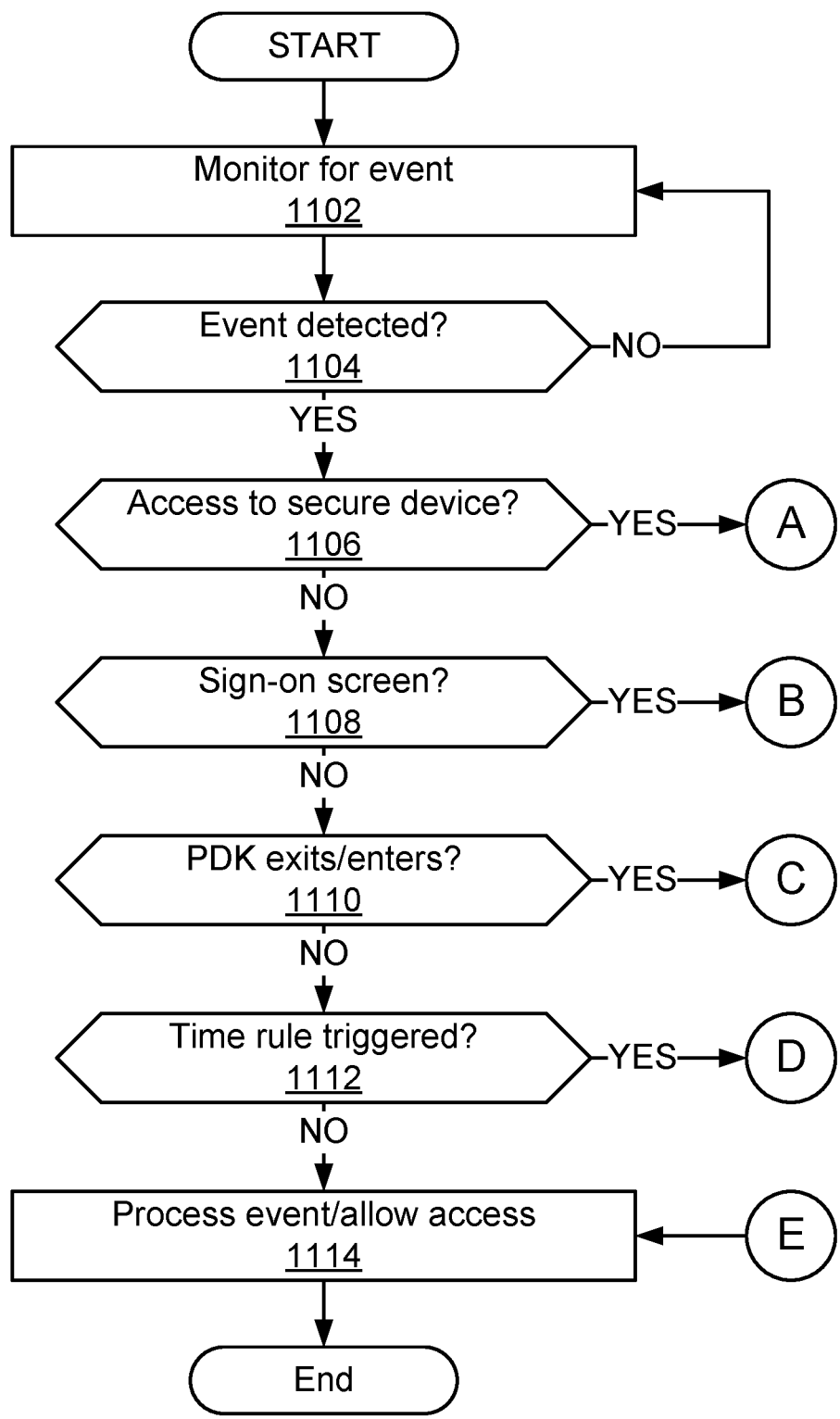
FIGS. 11A-11E are a flowchart of an embodiment of a method for controlling access to computing resources in accordance with the present invention.
Figure 11B:
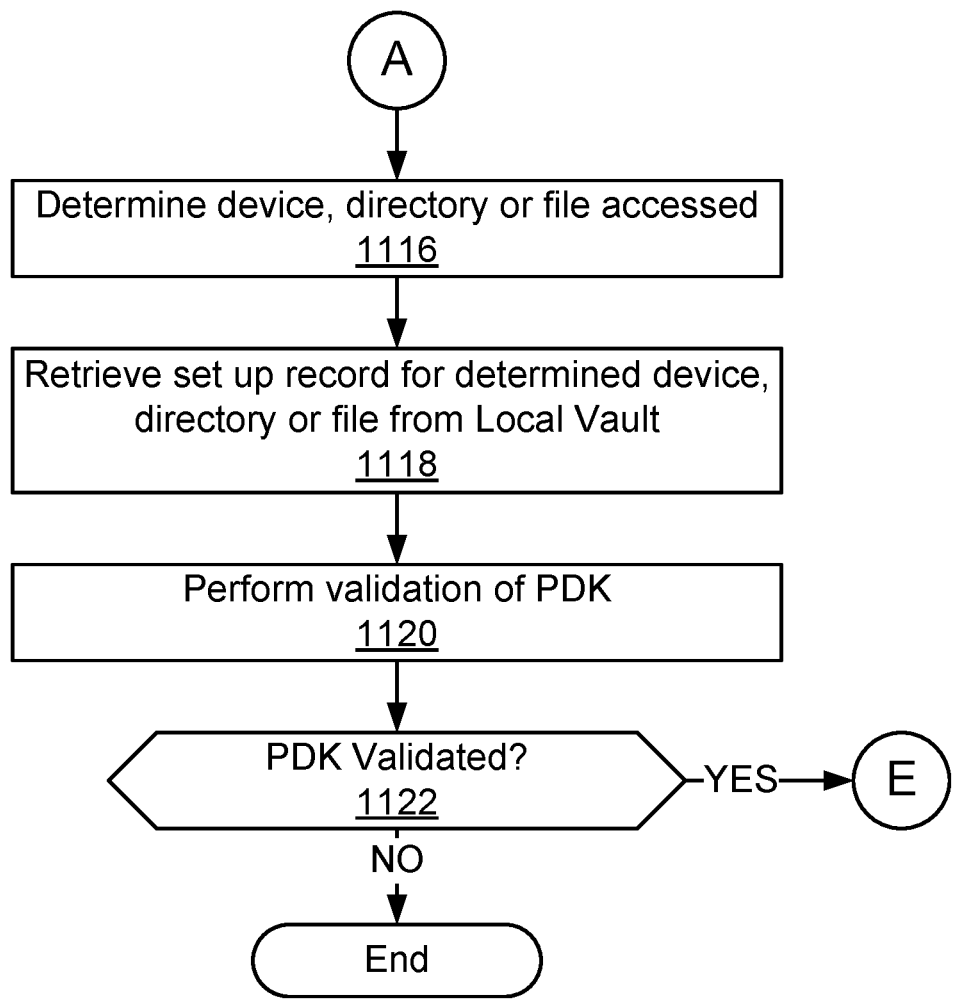
Figure 11C:
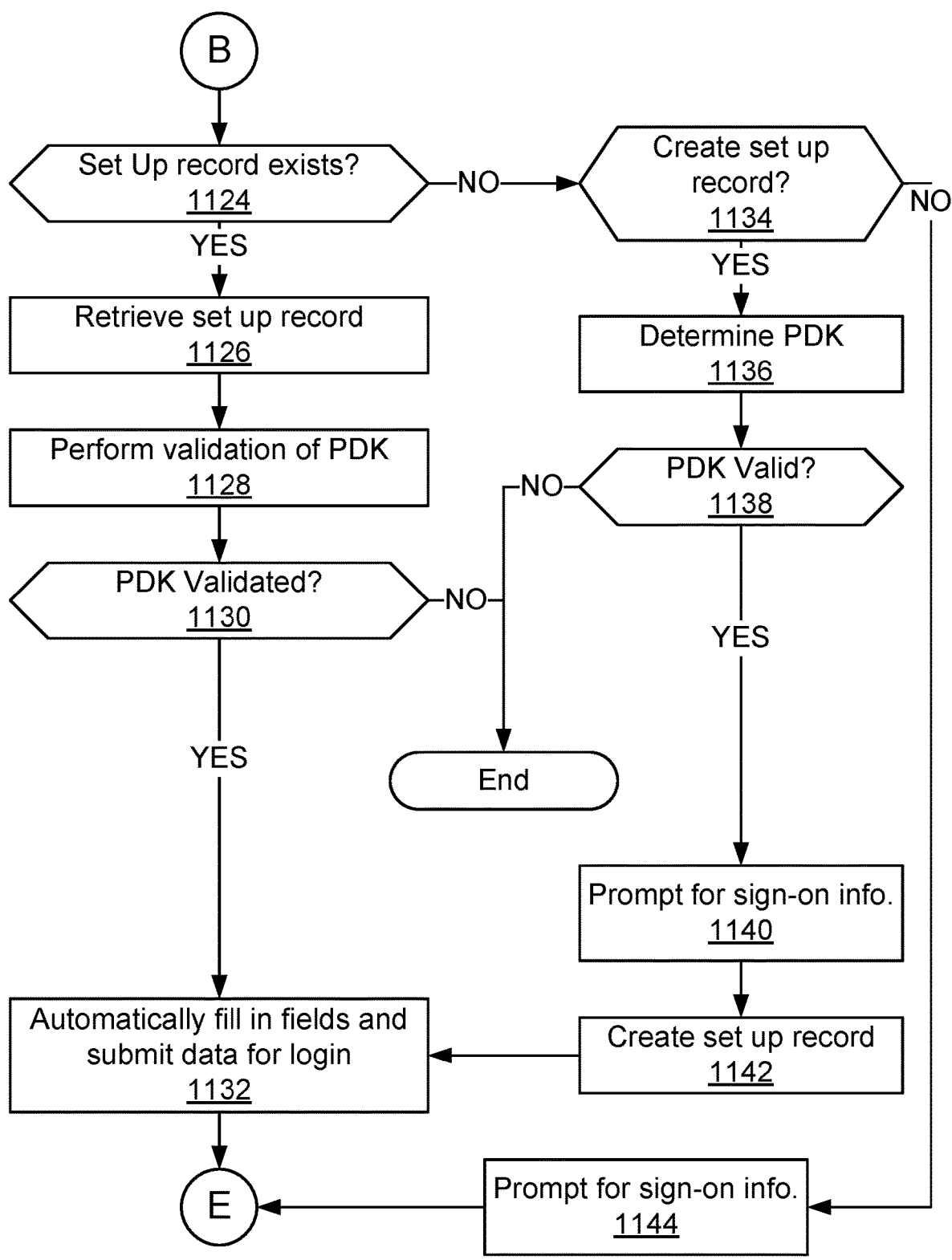
Figure 11D:
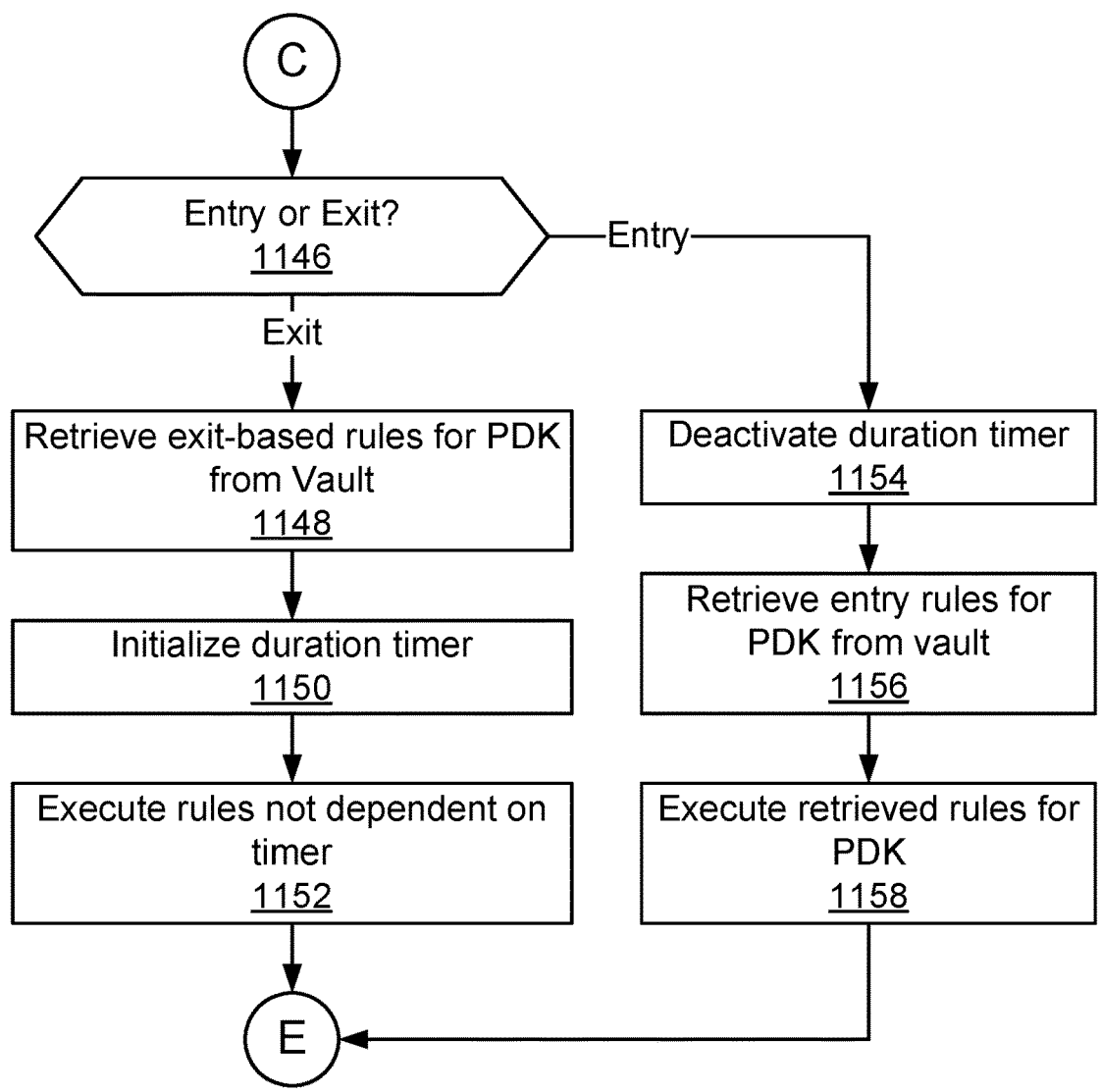
Figure 11E:
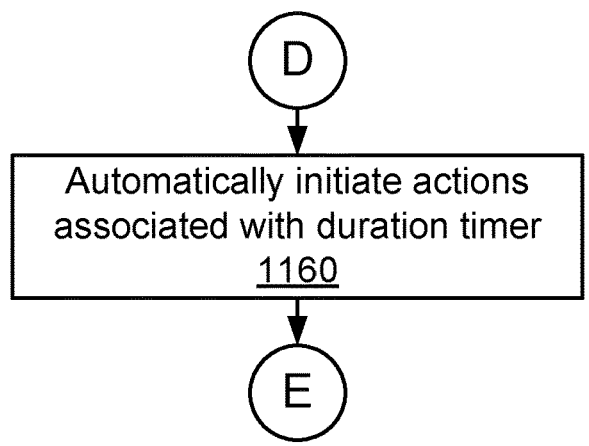

FIG. 8 shows a first embodiment of a method for initializing the security system 100 in accordance with the present invention. The method begins by connecting 802 the reader 104 to the computing device 106 and initialize reader 104. Once reader 104 is connected to the computing device 106, it receives power from computing device 106. The reader 104 upon power up performs 802 initialization of its own systems and also begins communication with the computing device 106. In particular, the reader 104 loads drivers on the computing device 106 such as its operating system (e.g., Windows) so that the reader 104 and the computing device 106 can communicate with each other. In another embodiment, the drivers may be provided on another media such as a flash drive or CD and loaded into the computing device in a conventional manner. Once the reader 104 is operational it is like a portal, in that it can link and communicate with any PDK 102. Next, the computing device 106 is initialized 804. More specifically, the computing device 106 downloads and runs the setup module 612 from the reader 104. This will also cause other applications required to be downloaded from the reader 104 to the computing device 106. Once the programs are downloaded from the reader 104 they are loaded and started. For example, the configuration application that generate and present the user interface of FIG. 10 is operation and presents the user interface 1000 so that the user's preferences for operation of the security system 100 can be entered. The initialization step 804 also creates the vault storage 764 on the computing device, load and start the detection engine 760. Finally, a PDK 102 is linked 806 to the reader 104 and initialized. In one embodiment, it is assumed that the PDK 102 has already been activated and associated with a user. Part of this activation process includes giving the PDK 102 a unique ID number and storing confidential information such as passwords and other data unique to the user in the PDK 102. The initialization of the PDK 102 process continues by identifying the PDK 102 and its unique ID so that this information can be used to determine when the PDK 102 comes within range of the reader 104 in the future. In particular, the PDK 102 is associated with the vault storage created in step 804. The first PDK 102 to interacts with the initialized computing device 106 is the master PDK 102. The master PDK 102 is the owner of the vault and acts like an administrator with the authorization to give proxies to other PDKs 102 that will allow them to access the vault but typically not to grant access to other PDKs 102. When the other PDKs are in range, the set up functionality of the computing device 106 is used for this assignment of rights (See FIG. 10, area 1012 below.) Once this is complete, the security system 100 is operational and ready for use.

Figure 9:
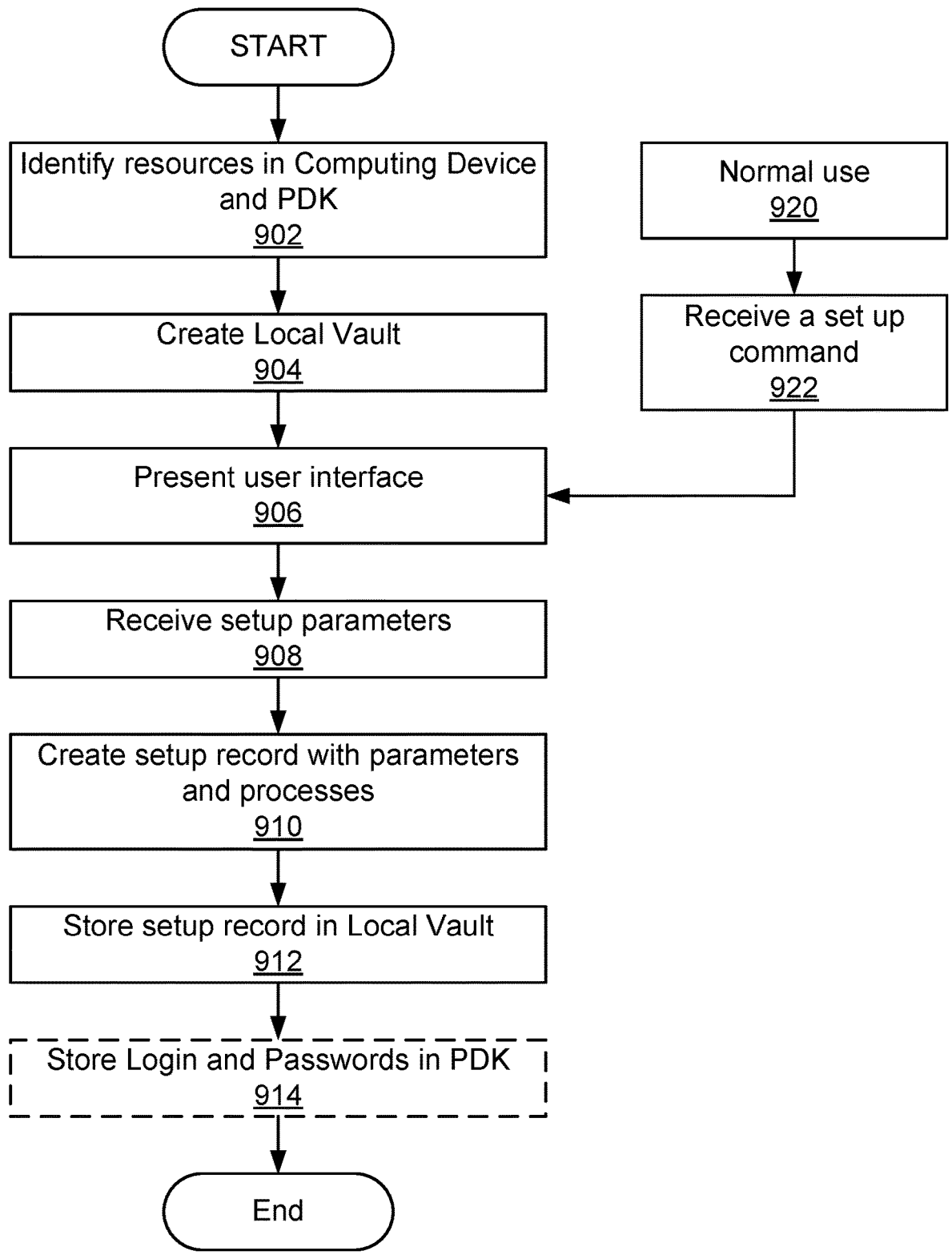
FIG. 9 is flowchart of a second embodiment of a method for initializing the security system in accordance with the present invention.

Referring now to FIG. 9, a second embodiment of the method for initializing the security system 100 in accordance with the present invention is shown. The method begins by identifying 902 computing resources in the computing device 106 and the PDK 104. This effectively identifies all possible items that can be protected items and thus subject to the access control and security constraints of the security system 100. This includes identifying disk drives, directories, files and sign-on screens that will be accessed via the security system 100. The method also identifies 902 PDKs 104 and the computing resource with which they are associated. Next, the method creates 904 a local vault or allocates memory 704 to create vault storage 762. The method then presents 906 a user interface on the computing device 106. For example, this is done with the user interface 1000 of FIG. 10 which will be described below. The user interacts with the interface 1000 and inputs a variety of a set up parameters. The computing device 106 receives 908 the setup parameters. Then the method creates 910 an item set up record with the parameters received from step 908 and specifying the processes performed when interacting with the item. The item set up record is a data record for a particular item holding the details of the detection engine 760 requires to correctly process (allow access or otherwise interact with) the item. In one embodiment, the item set up record includes information about how to access the item, whether the data is encrypted, etc. but does not store the decryption key or other actual security data as it is provided by the PDK 102. Next, the method stores 912 the item set up record in the vault storage 762 or local law. In some embodiments, the PDK 102 stores login information passwords such as needed for sign-on screens. For such cases the method also stores 914 this information in the PDK 102 during this initialization process. The present invention is particularly advantageous because the item set up records are stored in the vault storage 762 while the login information needed for sign-on is stored in the PDK 102, thus enabling maximum mobility. It should be understood that the reader 104 does not store any runtime information but merely acts as a means for the PDK to indicate with the computing device 106, in particular, the protected items. When the security system 100 is operational, the detection engine 760 searches the vault storage 762 for instructions on how interaction with the protected item is undertaken at and accesses the PDK 102 if needed as appropriate. It should be understood that in one embodiment, the item set up records are processed hierarchically where the set up rules specified in a item set up record for file override the set up rules specified in an item set up record for directories, and the set up rules specified in an item set up record for a directory overrides the set up rules specified in an item set up record for a component (e.g., the entire data storage device 706).

As also shown in FIG. 9, in addition to the manual setup using user interface 1000 of FIG. 10 when the security system 100 is initially put into operation, the user may at any time during normal use 920 input command indicating that they would like to apply security constraints to an item. For example, during all operation of the computing device 106, the user may just drive and right click the mouse cursor on the icon to input a set up command to the security system 100. The system receives 922 set up command and then proceeds to perform steps 906 through 914 as has been described above. This is particularly advantageous because it allows the user at any time to modify, add or remove security controls from protected item.

Referring now FIG. 10, one embodiment of the set up user interface 1000 in accordance with the present invention will be described. The user interface 1000 includes a plurality of areas 1002, 1004, 1006, 1008, 1010, 1012, 1014 and 1016 to specify the item to be protected as well as actions or rules to be followed in granting access to the protected item. In a first region 1002, the user interface 1000 present buttons representing major categories of items that can be protected. For example, the buttons shown in FIG. 10 are three possible protected items including: storage devices, directories and files, and sign-on screens. In another embodiment, additional buttons may be provided for services such as e-commerce, digital signature, and electronic identification. Those skilled in the art will recognized that any number of buttons may be provided depending on the categories of items that are protected by the security system 100. Selecting a button in the first region 1002, causes the items displayed in window 1016 to be limited to those items that are in the selected category. The window 1016 may also be used to select a particular item from the list of items displayed in the window 1016. However as shown in FIG. 10, since no button has been selected the items of all categories are shown in the window 1016. Below the window 1016, the user interface 1000 presents a series of buttons 1014 selectable to add, delete or save the input parameters of the user interface 1000 as an item set up record. An additional button is provided for canceling the setup process. Those skilled in the art will recognize that a similar version to the user interface 1000 shown in FIG. 10, but pre-populated with information about a specific device or item, is presented when the user accesses the set up interface 1000 via a direct command (e.g., right mouse click) such as described above with reference to step 922 of FIG. 9. The regions 1004, 1006, 1008 on the right side of the user interface 1000 provides regions in which the user can specify what actions the security system 100 will perform when allowing or denying access to the protected items. For example, region 1004 presents options for whether access will be automatically allowed when the PDK 102 is detected as being within range of that reader 104. Region 1006 specifies reconfirmation options in which the user can specify how often the security system 100 must confirm that the PDK 102 continues to be within range of the reader 104. Moreover, the user can specify that biometric confirmation is required in addition to the PDK 102 being present. Such biometric confirmation can be provided by a biometric reader on the PDK 102, the reader 104 or other device connected to the computing device 106. Region 1008 allows the user to specify automatic securing options for specifying what action will be taken by the security system 100 when the PDK 102 is not detected, or a PDK 102 removal event is received. Yet another region 1010 allows the user to specify a number of other miscellaneous options. These miscellaneous options may be presented or removed depending on the type of item selected and displayed in window 1016. One option is to keep a copy of the item set up record in the PDK 102. This option is only available for the sign on setup. Another option is to apply settings to all directories and files (overriding their items set up record). This option is only available when the item type is a storage device or a directory. A third miscellaneous option is displaying a secure screensaver when the auto-secure option is enabled and the PDK is no longer detected. While this option is available for any item it has a default setting of being selected for all items. Finally, the last region 1012 provides an area in which PDKs 102 can be grouped or assigned proxies. This last region 1012 also provides an option for inputting a backup password that can be used to enable the system when the PDK 102 is not available.

Referring now to FIGS. 11A-11E, an embodiment of a method for controlling access to computing resources in accordance with the present invention is described. Referring specifically to the FIG. 11A, the method begins by monitoring 1102 for an event or trigger. An event is any attempt by the computing device 106 to access a storage device, to access a directory, to access a file, any time a login screen is displayed, or any time based trigger. While the present invention will now be described in the context of these events, those skilled in the art will recognize that other events involving the use of other computing resources of the computing system 106 may also have an item set up record established and stored in the vault storage 762 such that the use of those computing resources is controlled by the security system 100 of the present invention in a manner similar to that described below for storage devices, files, directories and sign-on screens. Next, the method determines 1104 whether an event was detected. In one embodiment, the monitoring and detecting is performed by detection engine 760. If the method determines that an event was not detected, the method returns to step 1102 to continue to monitor for events. However, if the method determines that an event was detected the method continues in step 1106. In steps 1106, 1108, 1110 and 1112, the method proceeds to determine the event type and perform the associated steps for that event type. If an event was detected but is not any of the types that the security system 100 protects, the method continues in step 1114 and processes the event and allows access to the computing resource as normal after which the process is complete and ends Referring now also to FIG. 11B, in step 1106, the method determines whether the event is an access to a secure device, file or directory. If not the method continues to step 1108 to determine whether the event was the presentation of a sign-on screen. However, if the method determined that the event is to access a secure device, the method continues to step 1116 of the FIG. 11B. The method determines 1116 the device, directory or file being accessed. Then the method retrieves 1118 the item set up record for the device, directory or file determined in step 1116 from the vault storage 762 and determines requirements for allowing access to the storage device directory or file. For example, the item set up record may specify whether access requires encryption. Those skilled in the art will recognize that any number of other requirements may be enforced by the security system 100 by adding them as requirements to the item set up record. These steps for the protected item will be performed as it is accessed and after the PDK identified in the item step up record is validated. Next, the method performs validation 1120 of PDK 102. In particular, the detection engine utilizes the reader 104 to conduct the appropriate authentication/validation, for example, requiring that the PDK 102 associated with the item set up record be within range of the reader 104. Then the method tests 1122 whether the PDK 102 was validated. If not the method is complete and ends with the security system 100 precluding access to the device, files or directory. In one embodiment, the security system 100 also displays appropriate message indicating that access was denied and correct steps that can be taken. On the other hand, if the PDK 102 was validated, the method transitions from step 1122 to step 1114 of FIG. 11A to process the event and allow access as normal. The requirements from the item set up record are also preformed prior to or during normal access to the device, files or directory In step 1108, the method determines whether the event was the presentation of a sign-on screen. If not the method continues to step 1110. However, if the method determined that the event was the presentation of a sign-on screen, the method continues to step 1124 of the FIG. 11C. Initially, the method determines whether an item setup record corresponding to the sign-on screen exists. If so, the method retrieves 1126 the item setup record from the vault storage 762. Then the method performs validation of 1128 of the PDK 102 and determines 1130 whether the PDK 102 is valid. If not the method is complete and ends with the security system 100 denying access to access to the sign-on screen, and thus other third party systems. However if the PDK 102 is validated, the detection engine 760 automatically fills in the fields of the sign-on screen with the information from the item setup record and submits the data for log-in. The method then returns to step 1114 of FIG. 11A to continue processing as normal. However if in step 1124, it is determined that an item set up record corresponding to the sign-on screen does not exist, the method prompts the user to determine whether to create 1134 an item setup record for this sign-on screen. If the user does not want to create a setup record, the method proceeds to step 1144 and prompts the user to manually enter the sign-on information and then continues to step 1114 of FIG. 11A to continue processing as normal. However, if the user does want to create a setup record for future use for this sign-on screen, the method continues to determine the PDK 102 for the user and whether it is in range. Then the method determines 1138 whether the PDK 102 is valid. If not, the method is complete and ends. Since the user does not have a valid PDK 102 they are not allowed to create a new record in the security system 100. On the other hand if the PDK 102 is determined to be valid in step 1138, the method prompts 1140 the user for sign-on information and receives the sign-on information. Then the method creates 1142 a new set up record corresponding to the sign-on screen and including the sign-on information received in step 1140 and stores it in the vault storage 762. The method continues to automatically fill in 1132 the fields and submit the data for login after which it proceeds to step 1114 of FIG. 11A for processing as normal.

In step 1110, the method determines whether the event was the detection of a PDK 102 entering or exiting the range of the reader 104. If not, the method proceeds to step 1122 tests for other types of events. However if the method determined that the event was the detection of a PDK 102 entering or exiting the range of the reader 104, the method proceeds to step 1146 of FIG. 11D. In step 1146, the method determines whether the event was the entry or exit of the PDK 102. If it was the exit of the PDK 102 from the range of the reader 104, the detection engine 760 retrieves 1148 exit-based rules corresponding to the PDK 102 from the vault storage 762. The detection engine 760 also determines which if any of the exit-based rules have a time dependency (e.g., an amount of time must lapse before they can be performed.) Then the detection engine 760 initializes 1150 the duration timer and provides it with the time dependent exit rules. Next, the method executes rules that are not dependent upon the duration timer and that should be executed when the PDK 102 exits the range of the reader 104. For example, depending on the configuration parameters entered by the user during initialization, some of the actions taken when the PDK exits the range of the reader 104 will be executed immediately once removal of the PDK 102 from the vicinity of the reader 104 is detected. Any such actions can be determined by reading the item set up record. Examples of such actions include automatically logging out, closing a window, or initializing the screensaver. After step 1152, the method transitions back to step 1114 of FIG. 11A. If in step 1146 the event was a determined to be the entry of a PDK 102 into the range of the reader 104 the method continues to deactivate 1154 any timers associated with the PDK 102 that are operational. The method retrieves 1156 an item set up record corresponding to the PDK 102 from the vault storage 762. The method then extracts rules from the item set up record and executes 1158 the extracted rules. For example, actions such as clearing a screensaver, launching a window, or retrieving, entering and submitting login data are executed in step 1158. After step 1158, the method transitions back to step 1114 of FIG. 11A.

In step 1112, the method determines whether the event was the detection of expiration of the duration timer. If not, the method proceeds to step 1114 to allow access as normal. However, if the event was the detection of expiration of the duration timer, the method continues in step 1160 of FIG. 11E. In step 1160, the method determines automatically initiates action associated with the duration time. For example, these are any action specified by the item set up record when the duration timer was started. They can include logging out, activating a screen saver, etc. as specified above as immediate actions. Those skilled in the art will recognize that there may be a variety of times where the duration timer is set to avoid the security system 100 to initiate action, even though the PDK 102 has only be out of range momentarily.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats. Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A computing device comprising:
a processor;
a data storage device including a plurality of protected items, the data storage device coupled for communication with the processor;
a vault storage storing a plurality of set up records, the vault storage coupled for communication with the processor, each set up record corresponding to a particular protected item from the plurality of protected items and storing only a process including a specific security action to be automatically performed to grant or deny access to the particular protected item from the plurality of protected items; and
a detection engine coupled to the processor, the data storage device, and the vault storage, the detection engine controlling the processor to determine whether access to a first protected item from the plurality of protected items is permitted based on detecting a personal digital key associated with the first protected item within a predefined range and automatically performing a first security action based on retrieving a first set up record corresponding to the first protected item from the vault storage.

2. The computing device of claim 1, wherein the vault storage is encrypted.

3. The computing device of claim 1, wherein the vault storage is locked such that only the detection engine may access and use information stored in the vault storage.

4. The computing device of claim 1, wherein the vault storage includes one vault file per computing device and personal digital key pair.

5. The computing device of claim 1, wherein the vault storage includes information about a proxy personal digital key and a back up password.

6. The computing device of claim 1, wherein the vault storage stores analytics data including key use, access privileges, and usage stats for the personal digital key.

7. The computing device of claim 1, wherein the predefined range is a range of the personal digital key to a reader.

8. The computing device of claim 1, wherein the first security action is one from a group of: encryption, decryption, biometric confirmation, validation of the personal digital key, personal digital key presence, presentation of sign-on screen, and time duration.

9. The computing device of claim 1, wherein the first set up record from the plurality of set up records specifies the first security action and a second set up record from the plurality of set up records specifies a second security action, and the first security action is different from the second security action.

10. The computing device of claim 1, further comprising a set up module coupled to the processor, the data storage device and the vault storage for initializing and setting up the computing device, the set up module generating the plurality of set up records and storing them in the vault storage.

11. The computing device of claim 1, wherein access includes one from a group of: an attempt by the computing device to access the data storage device, an attempt by the computing device to access a directory, an attempt by the computing device to access a file, a display of a login screen, clearing a screen saver, launching a window, launching an application, and a time based trigger.

12. A method for controlling access to a protected item stored on a computing device, the method comprising:
detecting, with a detection engine, a personal digital key associated with the protected item within a predefined range;
responsive to detecting the personal digital key associated with the protected item within the predefined range, retrieving a set up record corresponding to the protected item from a vault storage storing a plurality of set up records, the set up record storing only a process including a specific security action to automatically perform to allow access to the protected item;

determining, from the set up record, the process including the specific security action to automatically perform to allow access to the protected item;

automatically performing the specific security action; and allowing access to the protected item based on the specific security action being automatically performed.

13. The method of claim 12 wherein the access to the protected item is allowed if both the personal digital key is within the predefined range of the computing device and the specific security action was performed.

14. The method of claim 12, wherein the specific security action is validation of the personal digital key.

15. The method of claim 14 further comprising automatically filling a field of a login screen with information from the set up record and submitting a login in response to validation of the personal digital key.

16. The method of claim 12, wherein the specific security action is biometric authentication.

17. The method of claim 12, wherein the computing device includes a plurality of protected items, and a second protected item has a corresponding second set up record including a second security action to access the second protected item and the second security action is different from the specific security action.

18. The method of claim 12, wherein the specific security action is one from a group of: encryption, decryption, biometric confirmation, validation of the personal digital key, personal digital key presence, presentation of a login screen, and time duration.

19. The method of claim 12, further comprising:

monitoring for an event with the detection engine;

detecting the event with the detection engine; and wherein the event includes one from a group of: an attempt by the computing device to access a storage device, an attempt by the computing device to access a directory, an attempt by the computing device to access a file, a display of a login screen by the computing device, clearing a screen saver, launching a window, launching an application, and a time based trigger.

20. The method of claim 12, further comprising identifying a new protected item, creating a new set up record corresponding to the new protected item including specifying a security action for the new protected item, and storing the new set up record in the vault storage.

\* \* \* \* \*